(12) United States Patent
Kim et al.

(10) Patent No.: US 7,766,078 B2
(45) Date of Patent: Aug. 3, 2010

(54) MODE DOOR FOR THE AUTOMOTIVE VEHICLE AIR CONDITIONING SYSTEM

(75) Inventors: Jong-Su Kim, Seoul (KR); Dae-Woong Lee, Seoul (KR)

(73) Assignee: Halla Climate Control Corp., Daejeon-si (KR)

( * ) Notice: Subject to any disclaimer, the term of this patent is extended or adjusted under 35 U.S.C. 154(b) by 1038 days.

(21) Appl. No.: 10/541,820

(22) PCT Filed: Jan. 9, 2004

(86) PCT No.: PCT/KR2004/000024

§ 371 (c)(1),
(2), (4) Date: Jul. 27, 2006

(87) PCT Pub. No.: WO2004/078497

PCT Pub. Date: Sep. 16, 2004

(65) Prior Publication Data

US 2006/0254295 A1    Nov. 16, 2006

(30) Foreign Application Priority Data

Jan. 11, 2003 (KR) .................. 10-2003-0001832
May 26, 2003 (KR) .................. 10-2003-0033363
Jun. 20, 2003 (KR) .................. 10-2003-0040185

(51) Int. Cl.
*B60H 1/00* (2006.01)
*B60H 3/00* (2006.01)
*F28F 27/00* (2006.01)
*F28F 27/02* (2006.01)

(52) U.S. Cl. .................... 165/204; 165/42; 165/43; 165/96; 165/100; 165/103; 165/202; 165/203

(58) Field of Classification Search ............ 165/42, 165/43, 202, 203, 204, 96, 100, 103; 454/152, 454/153, 155, 60, 70
See application file for complete search history.

(56) References Cited

U.S. PATENT DOCUMENTS

| 4,216,822 | A | * | 8/1980 | Izumi ................... 165/42 |
| 5,720,657 | A | * | 2/1998 | Kamiya et al. ........ 454/121 |
| 6,113,483 | A | * | 9/2000 | Schambre et al. .... 454/121 |
| 2002/0084058 | A1 | * | 7/2002 | Ozeki et al. ............ 165/42 |

FOREIGN PATENT DOCUMENTS

| JP | 5-69731 | | 3/1993 |
| JP | 08020218 A | * | 1/1996 |
| JP | 10-29419 A | | 2/1998 |
| JP | 10-53017 | | 2/1998 |
| JP | 10-297246 A | | 11/1998 |
| JP | 2001-97022 A | | 4/2001 |

* cited by examiner

*Primary Examiner*—Frantz F. Jules
*Assistant Examiner*—Travis Ruby
(74) *Attorney, Agent, or Firm*—Lowe Hauptman Ham & Berner LLP

(57) ABSTRACT

An automotive vehicle air conditioning system has air introduced into an air conditioning case. The introduced air is always discharged to both sides of a passenger compartment regardless of the air conditioner mode while the air conditioning system maintains the amount of air discharged through defrost openings in a defrost mode. Air leakage between both sides of a mode door and the air conditioning case is effectively prevented by a cover carried by the mode door without additional sealing to improve air conditioning performance.

9 Claims, 22 Drawing Sheets

Prior Art

Prior Art

Prior Art

MODE DOOR FOR THE AUTOMOTIVE VEHICLE AIR CONDITIONING SYSTEM

CROSS-REFERENCE TO RELATED APPLICATIONS

This is a U.S. National Phase PCT application and claims the benefit of the filing date of PCT/KR2004/000024, filed Jan. 9, 2004, and also claims the benefit of priority under 35 U.S.C. §119 of Korean Application Nos. 10-2003-0001832, filed Jan. 11, 2003; 10-2003-0033363, filed May 26, 2003; and 10-2003-0040185, filed Jun. 20, 2003, the entire disclosures of which are hereby herein incorporated by reference.

TECHNICAL FIELD

The present invention relates to an air conditioning system for automobiles, and more particularly, to an air conditioning system for automobiles in which air introduced into an air conditioning case is always discharged to both sides of the passenger compartment of a vehicle regardless of the specific mode while the air conditioning system is maintaining the amount of air discharged through defrost openings in a defrost mode, and in which leakage of air between both sides of a mode door and the air conditioning case is effectively prevented without requiring an additional sealing process to thereby improve air conditioning performance.

BACKGROUND ART

An air conditioner for automobiles typically refers to a device in which outside air introduced by a fan undergoes heat exchange by being selectively passed through an evaporator through which refrigerant flows or a heater core through which engine cooling water flows, after which the air is ventilated through openings communicating with various areas within the passenger compartment to thereby cool or heat the passenger compartment. Such an air conditioner includes a cylindrical mode door for selectively supplying the heat exchanged air to various areas within the passenger compartments.

A structure of a conventional air conditioning system for automobiles will be described hereinafter with reference to FIGS. 1 through 5.

First, as shown in FIG. 1, a fan 101 is mounted within an air conditioning case 100, and outside air is drawn into the air conditioning case 100 through an air inlet port (not shown) of the air conditioning case 100 by the fan 101 and is ventilated in the direction of the arrow S.

A front opening 104, a floor opening 105, and a defrost opening 106 are formed in the air conditioning case 100 to enable air to be discharged into various areas of the passenger compartment after the air is supplied to inside the air conditioning case 100 and selectively passed through an evaporator 102 or a heater core 103 to undergo cooling or heating. The openings 104, 105, and 106 are uniformly formed adjacent to one another in a rotational direction of a cylindrical door 107, which will be described below.

The front opening 104 is an opening for discharging air toward the upper half of passengers' bodies, while the floor opening 105 is an opening for discharging air toward the lower half of passengers' bodies. The defrost opening 106 is an opening for discharging air toward the inside of the front windshield to remove frost therefrom.

The cylindrical door 107 is a mode door that adjusts an opening area of the openings 104, 105, and 106 depending on the fan mode. The cylindrical door 107 is rotatably mounted in the air conditioning case 100.

The cylindrical door 107, with reference to FIG. 2, includes a rotating door 108 and a film member 109. The rotating door 108 includes semicircular side walls 110 and a main wall 11 in the shape of a circular arc. A rotating shaft 108a is formed in each of the side walls 110. Each of the rotating shafts 108a is positioned substantially in a center of a curvature of the main wall 111 and is protruded outwardly along an axial direction. Although the side walls 110 are described as being semicircular, they may also be circular.

The main wall 111 includes four apertures 111a formed in the axial direction and substantially uniformly spaced apart from one another in the circumferential direction thereof.

The film member 109 is flexible and does not allow the passage of air therethrough. Also, the film member 109 has an overall quadrilateral shape with a width that is almost identical to a dimension of the main wall 111 of the rotating door 108 in the axial direction. Ventilation openings 109a are formed in the film member 109 in a lengthwise direction thereof.

The remaining elements shown in FIG. 2 are those used to mount the film member 109 on the rotating door 108, and so a detailed description thereof will be omitted.

The process of changing the fan mode by operation of the cylindrical door 107 will now be briefly described with reference to FIG. 3.

First in a front mode, the cylindrical door 107 is rotated such that only the front opening 104 is open, while the remaining openings 105 and 106 are closed. As a result, air introduced into the air conditioning case 100 by operation of the fan 101 passes through the apertures 111a of the cylindrical door 107 and through the ventilation openings 109a of the film member 109 to pass through the front opening 104 to be discharged into the passenger compartment (air flow I). The film member 109 expands in a circumferential direction by air pressure such that the film member 109 is pressed firmly against circumferential edges 112 and 113 of the front opening 104 to prevent gaps from being formed between these elements. Therefore, air does not leak in this area of the circumferential edges 112 and 113, and is discharged through the front opening 104 only.

When desiring to change to a fan mode in which the openings 105 and 106 are opened, the cylindrical door 107 is rotated to thereby alter the positioning of the apertures 111a of the cylindrical door 107.

As described above, the leakage of air between the main wall 111 of the cylindrical door 107 and an inner surface of the air conditioning case 100 is prevented by expansion of the film member 109.

Referring to FIG. 4, a gap between both of the side walls 110 of the cylindrical door 107 and the inner surface of the air conditioning case 100 is sealed using a sealing member 120 to thereby prevent the leakage of air through this gap.

However, in the conventional air conditioning system for automobiles described above, friction is generated between the sealing member 120 and the inner surface of the air conditioning case 100 when the cylindrical door 107 is rotated. This, in turn, causes the generation of noise. In addition, it is necessary to perform an additional sealing process during production of the cylindrical door 107 such that costs associated with the manufacture of the air conditioning case 100 are increased and assembly of the cylindrical door 107 and the air conditioning case is made complicated.

In modern air conditioning systems for automobiles, the front opening is divided into a center opening and two side openings formed to opposite sides of the center opening, and a function is provided such that air introduced into the air conditioning case is continuously discharged to both sides of the passenger compartment through the side openings.

FIG. 5 is a plan view of an air conditioning system (when viewed from above) having such a continuous discharge function.

In the air conditioning system of FIG. 5, side openings 214 are formed to opposite sides of a center opening 204 that is positioned to an upper area of an air conditioning case 200. Constant discharge openings 207a are formed in the vicinity of both ends of a cylindrical door 207 mounted within the air conditioning case 200, and an aperture 207b is formed in a lengthwise direction of the cylindrical door 207. In the air conditioning system structured in this manner, air is always discharged through side openings 214 via the constant discharge openings 207a of the cylindrical door 207 even when not in a defrost mode (for removal of frost) such that frost generated on the front windshield may be removed.

That is, in the case of the front mode with reference to FIG. 5a, the aperture 207b of the cylindrical door 207 communicates with the center opening 204, and the constant discharge openings 207a of the cylindrical door 207 communicate with the side openings 214. In the case of the defrost mode with reference to FIG. 5b, the aperture 207b of the cylindrical door 207 communicates with a defrost opening 206, and the constant discharge openings 207a of the cylindrical door 207 communicates with the side openings 214 as when in the front mode.

A constant discharge opening cover 220 that covers the constant discharge opening 207a of the cylindrical door 207 is mounted to one side of the defrost opening 206. This prevents air from being discharged through the defrost opening 206 via the constant discharge openings 207a while in the front mode, and hence reducing the amount of air that is discharged toward the front of the passenger compartment. That is, in the above conventional air conditioning system for automobiles, in a mode other than the defrost mode (e.g., the front mode or floor mode), air is prevented from being discharged through the defrost opening 206 through the constant discharge holes 207a of the cylindrical door 207.

However, with the above structure of the conventional air conditioning system for automobiles, the above function is realized by merely reducing a size of the defrost opening 206. As a result, the amount of air used to remove frost in the defrost mode is significantly reduced.

DISCLOSURE OF INVENTION

Accordingly, the present invention has been made in an effort to solve the above problems of the prior art. It is an object of the present invention to provide an air conditioning system for automobiles in which air introduced into an air conditioning case is always discharged to both sides of the passenger compartment of a vehicle regardless of the specific mode while the air conditioning system is maintaining the amount of air discharged through defrost openings in a defrost mode, and in which leakage of air between both sides of a mode door and the air conditioning case is effectively prevented without requiring an additional sealing process to thereby improve air conditioning performance.

To achieve the above object, the present invention provides an air conditioning system for automobiles including an air conditioning case that has a center opening, side openings, a defrost opening, and a floor opening formed therein, and a mode door that is mounted in the air conditioning case and that opens and closes the openings depending on a mode, wherein the mode door is a rotating door including: rotating shafts rotatably supported on two side walls of the air conditioning case; an outer circumferential wall extended in the direction of the rotating shafts; a center aperture and side apertures individually formed on an upper surface of the outer circumferential wall; connectors for connecting the outer circumferential wall and the rotating shafts to thereby define side apertures; and an air inflow opening formed to allow the introduction of air between the outer circumferential wall and the connectors, wherein paths communicating with the side apertures are formed in the air conditioning case such that air introduced into the mode door is constantly discharged through the side openings via the side apertures.

The paths are formed by extending the side openings outwardly in the direction of a length of the mode door.

Also, the outer circumferential wall of the mode door is substantially in the shape of a circular arc.

The side apertures are formed adjacent to both sides of the center aperture.

Air leakage preventing means is provided in the mode door and the air conditioning case.

The air leakage preventing means includes at least one coupling part and at least one receiving part for receiving the at least one coupling part, the at least one coupling part and the at least one receiving part being formed in side surfaces of the mode door and opposing surfaces of the air conditioning case.

The at least one coupling part is a protrusion formed on the side surfaces of the mode door, and the at least one receiving part is a groove formed in the air conditioning case to receive the protrusion of the mode door.

Further, the at least one coupling part is a stepped portion formed on the side surfaces of the mode door, and the at least one receiving part is a groove for receiving the stepped portion of the mode door.

A door cover is included on the outer circumferential wall of the rotating door. The door cover includes ventilation apertures communicating with each of the center opening and the side openings, ventilation apertures communicating with the defrost opening and the floor opening, a sealing member mounted to a surface of the door cover contacting the outer circumferential wall of the rotating door, and fixing means secured to an inner area of the air conditioning case.

The fixing means are fixing pins formed from side walls of the door cover.

BRIEF DESCRIPTION OF DRAWINGS

Further objects and advantages of the invention can be more fully understood from the following detailed description taken in conjunction with the accompanying drawings in which:

FIG. 4a is a partial side sectional view showing a state where the cylindrical door is mounted to the air conditioning case, and FIG. 4b is a sectional view taken along line A-A of FIG. 4a.

FIG. 5a shows the air conditioning system in a front mode, and FIG. 5b shows the air conditioning system in a defrost mode.

FIG. 7a is a perspective view, and FIG. 7b is a rear view.

FIG. 9 are partially cutaway perspective views of a mode door of an embodiment of the present invention, where

FIG. 11a is a view of the air conditioning system in a front mode, and FIG. 11b is a view of the air conditioning system in a defrost mode.

FIG. 12a is a partial side sectional view of a state in which a mode door is mounted to an air conditioning case, and FIG. 12b is a sectional view taken along line B-B of FIG. 12a.

BEST MODE FOR CARRYING OUT THE INVENTION

Preferred embodiments of the present invention are described in detail with reference to the accompanying drawings.

Figure 6:
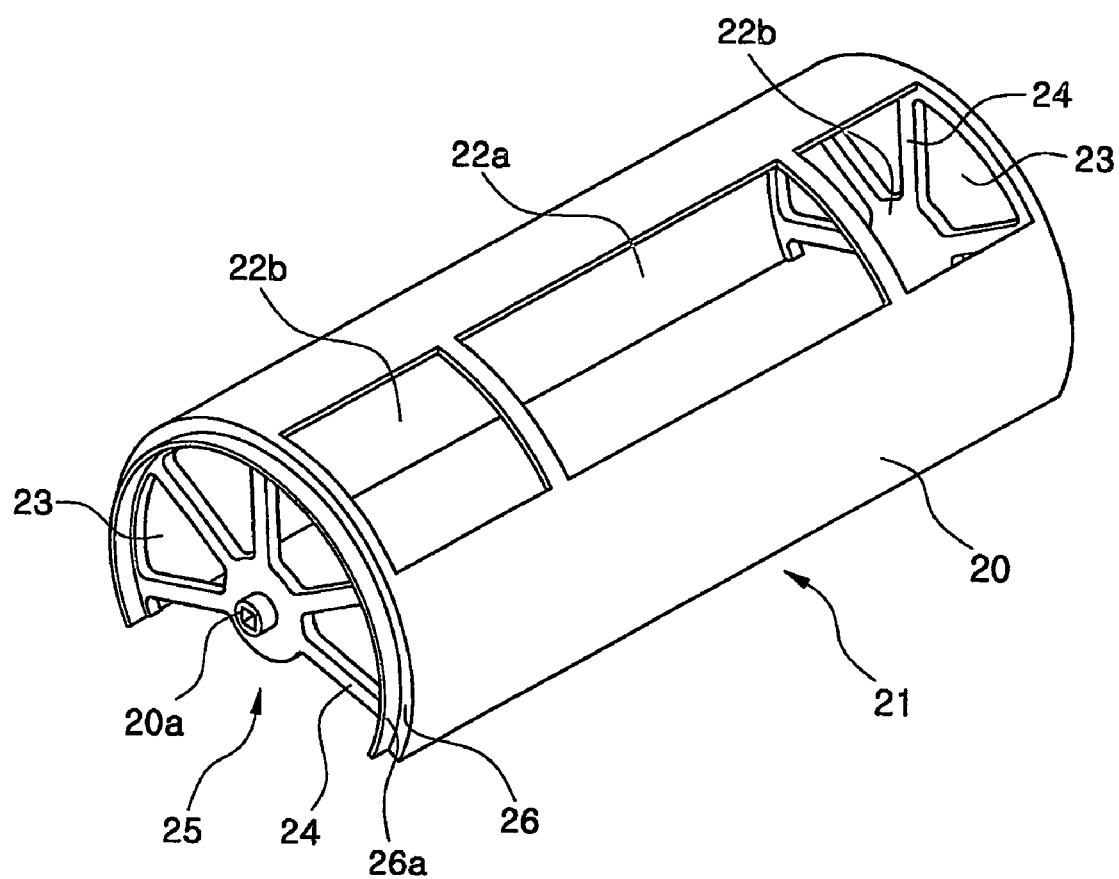
FIG. 6 is a perspective view of an example of a mode door of the present invention.
Figure 7:
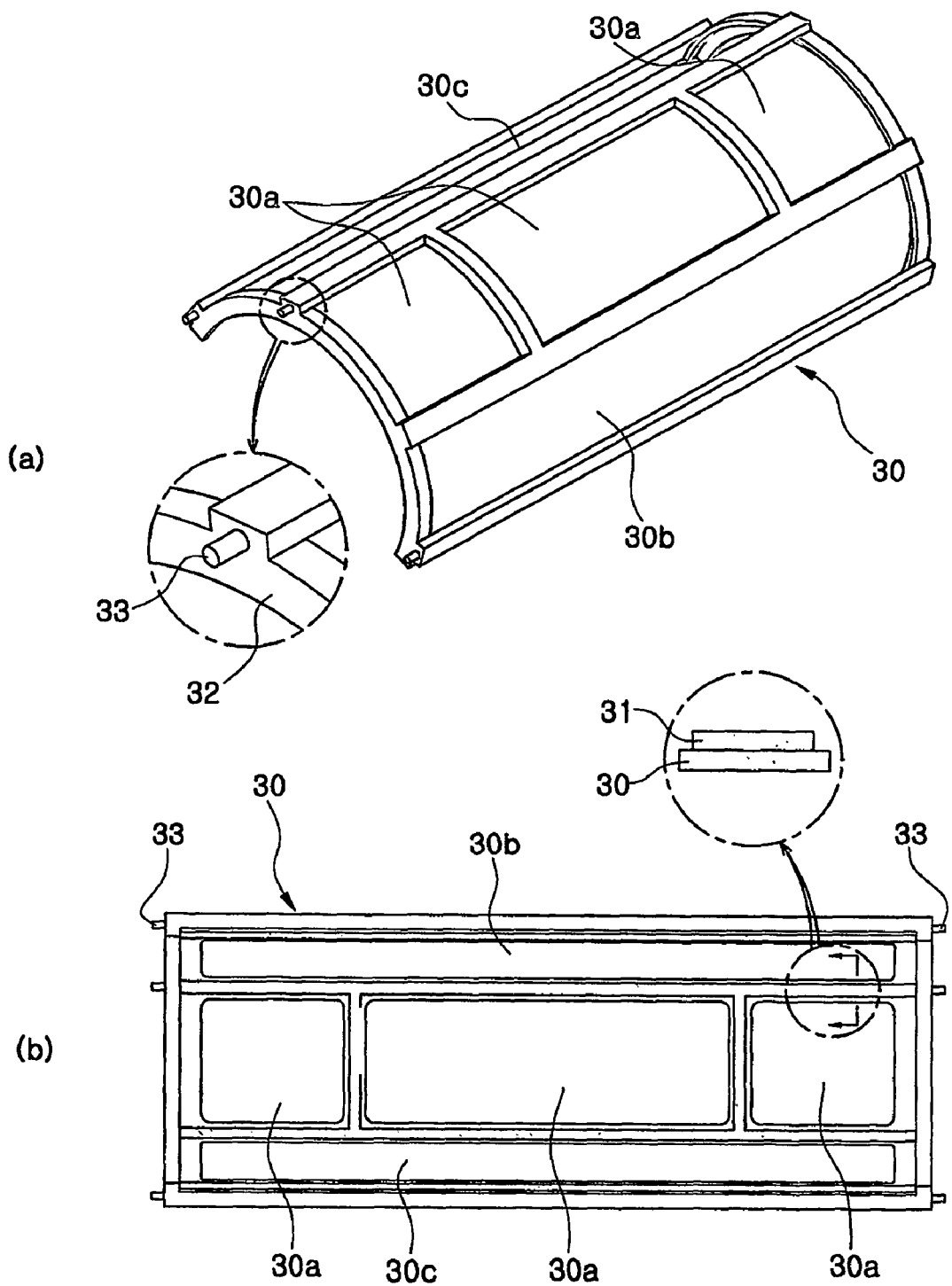
FIG. 7 is a perspective view of a door cover mounted to a circumferential surface of a mode door according to an embodiment of the present invention, where
Figure 8:
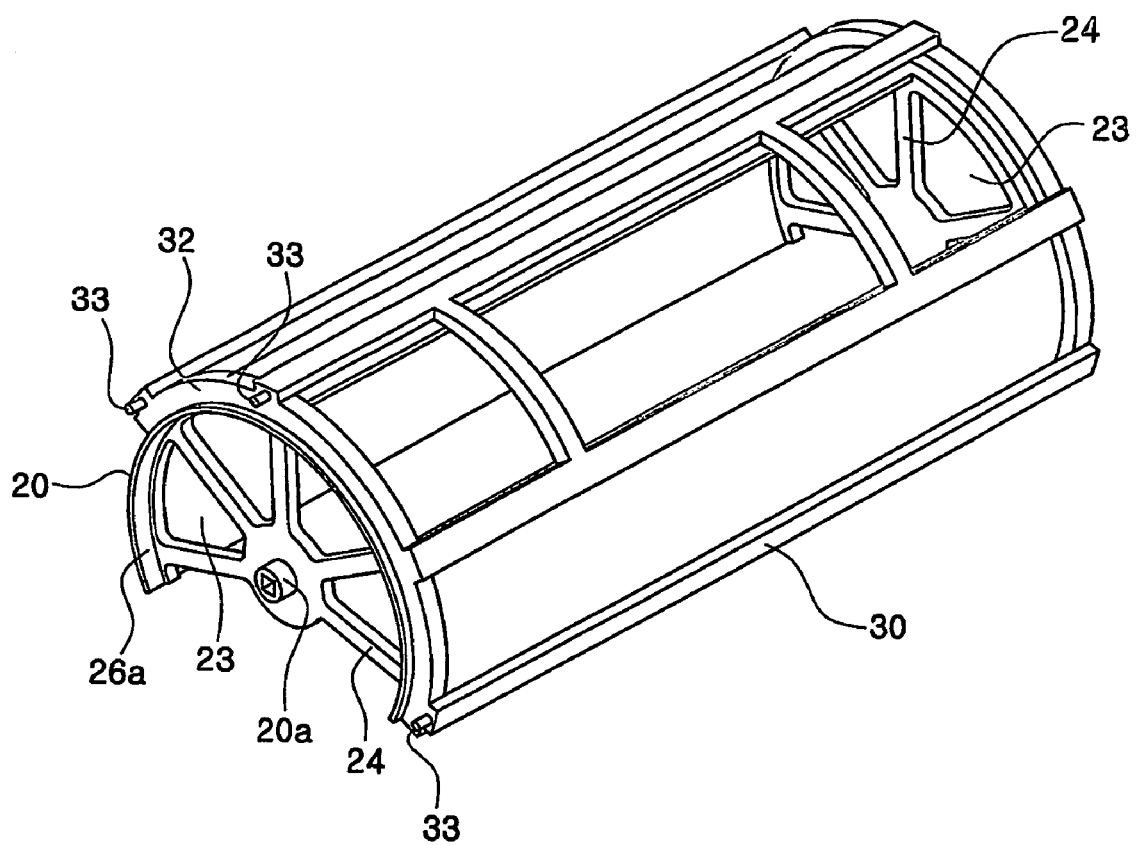
FIG. 8 is a perspective view of a mode door of the present invention in a state where a door cover is mounted to its circumferential surface.

FIG. 6 is a perspective view of an example of a mode door of an embodiment of the present invention; FIG. 7 is an illustration of a door cover mounted to a circumferential surface of the mode door according to the present invention, where FIG. 7a is a perspective view, and FIG. 7b is a rear view; and FIG. 8 is a perspective view of an embodiment of the mode door of the present invention in a state where a door cover is mounted to its circumferential surface.

The mode door of an embodiment of the present invention, with reference to FIG. 6, is realized through a rotating door 20 that includes rotating shafts 20a rotatably supported on two side walls of an air conditioning case 10 (see FIGS. 9 and 10); an outer circumferential wall 21 that is formed between the rotating shafts 20a in substantially the shape of a circular arc; apertures 22a and 22b formed in the outer circumferential wall; connectors 24 for connecting the outer circumferential wall 21 and the rotating shafts 20a, the connectors 24 being formed radially about the rotating shafts 20a and at predetermined intervals on a side surface of the outer circumferential wall 21 to thereby define left and right apertures 23; and an air inflow opening 25 formed to allow the introduction of air between the outer circumferential wall 21 and the connectors 24.

The apertures 22a and 22b include one center aperture 22a formed in a center area, and two side apertures 22b formed to opposite sides of the center aperture 22a The number of the apertures 22a and 22b may be adjusted as needed.

Two side surfaces of the rotating door 20 are tightly coupled with an inner wall of the air conditioning case 10 to form air leakage preventing means.

The mode door having this structure, with reference to FIG. 7, further includes a door cover 30 mounted to an outer circumferential surface of the rotating door 20.

Referring to FIGS. 7 and 8, the door cover 30 is placed on the outer circumferential wall 21 of the rotating door 20, and acts to prevent the leakage of air between the outer circumferential wall 21 of the rotating door 20 and the inner surface of the air conditioning case 10 as in the conventional system. The door cover 30 includes three ventilation openings 30a communicating with center and side openings of the air conditioning case 10, and two ventilation apertures 30b and 30c formed in both side surfaces and communicating with a defrost opening and a floor opening of the air conditioning case 10. The number of the ventilation apertures 30a, 30b, and 30c may be adjusted as needed. Further, a sealing member 31 made of, for example, rubber or sponge material, is mounted to a surface of the door cover 30 contacting the rotating door 20. Since the sealing member 31 is simply mounted to the door cover 30 using a double injection process, ease of assembly between the air conditioning case 10 and the mode door is improved.

In addition, fixing means, for example, fixing pins 33 for insertion into grooves (not shown) formed in an inner wall of the air conditioning case 10 to thereby secure the door cover 30 to the inner wall of the air conditioning case 10 are formed in side walls 32 of the door cover 30. The fixing pins 33 are formed extending from the side walls 32 of the door cover 30 at predetermined intervals. Hence, the fixing pins 33 act also as guide pins when the mode door is mounted inside the air conditioning case 10 such that the mode door may be more easily mounted to a specific position in the air conditioning case 10 compared to the conventional mode door.

In FIGS. 7 and 8, three of the fixing pins 33 are formed on each side wall 32 of the door cover 30. However, this number may be adjusted as needed. In this embodiment, although an example was described in which the fixing pins 33 are formed in the side walls 32 of the door cover 30, it is also possible to use an opposite configuration such that grooves are formed in the side walls 32 of the door cover 30 and fixing pins inserted into the grooves are formed in the inner wall of the air conditioning case 10.

Figure 9A:
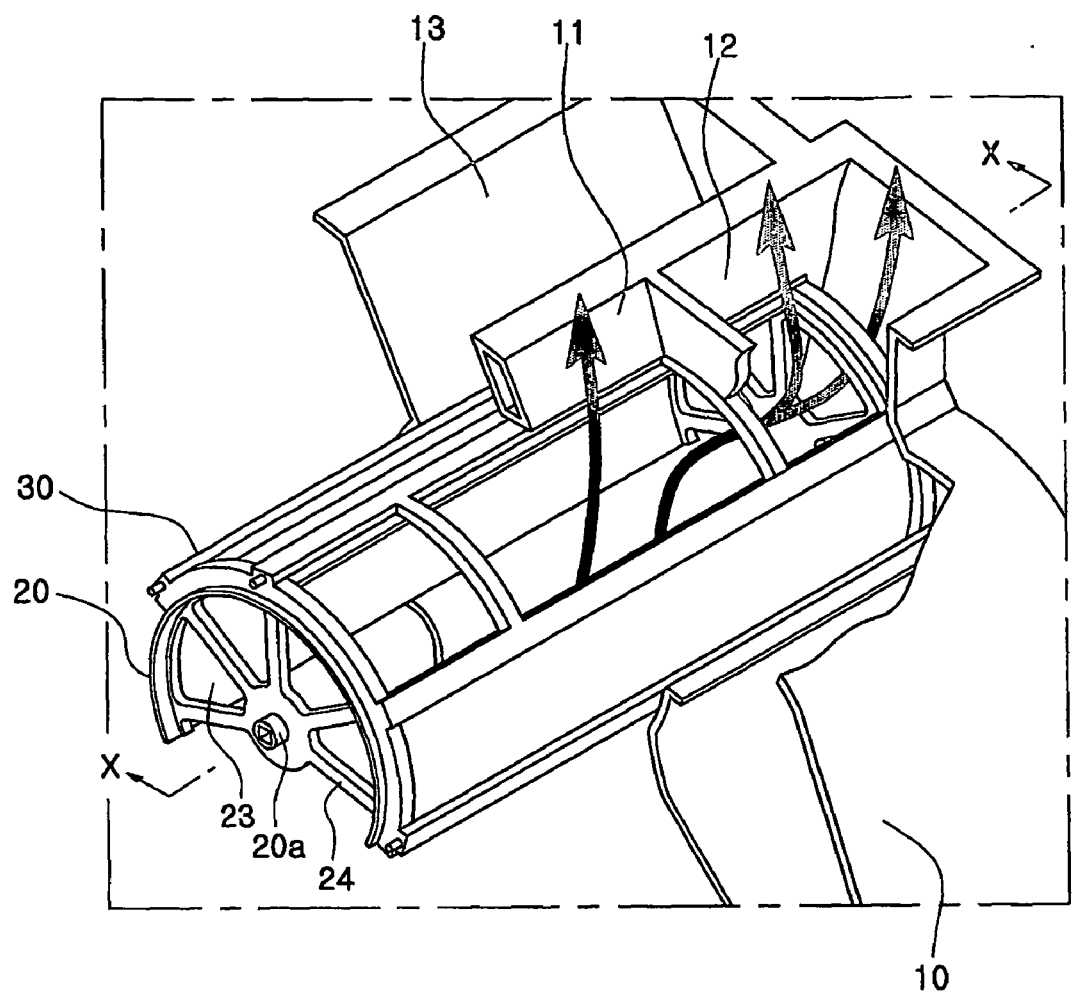
FIG. 9a is a view of the mode door in a front mode state.
Figure 9B:
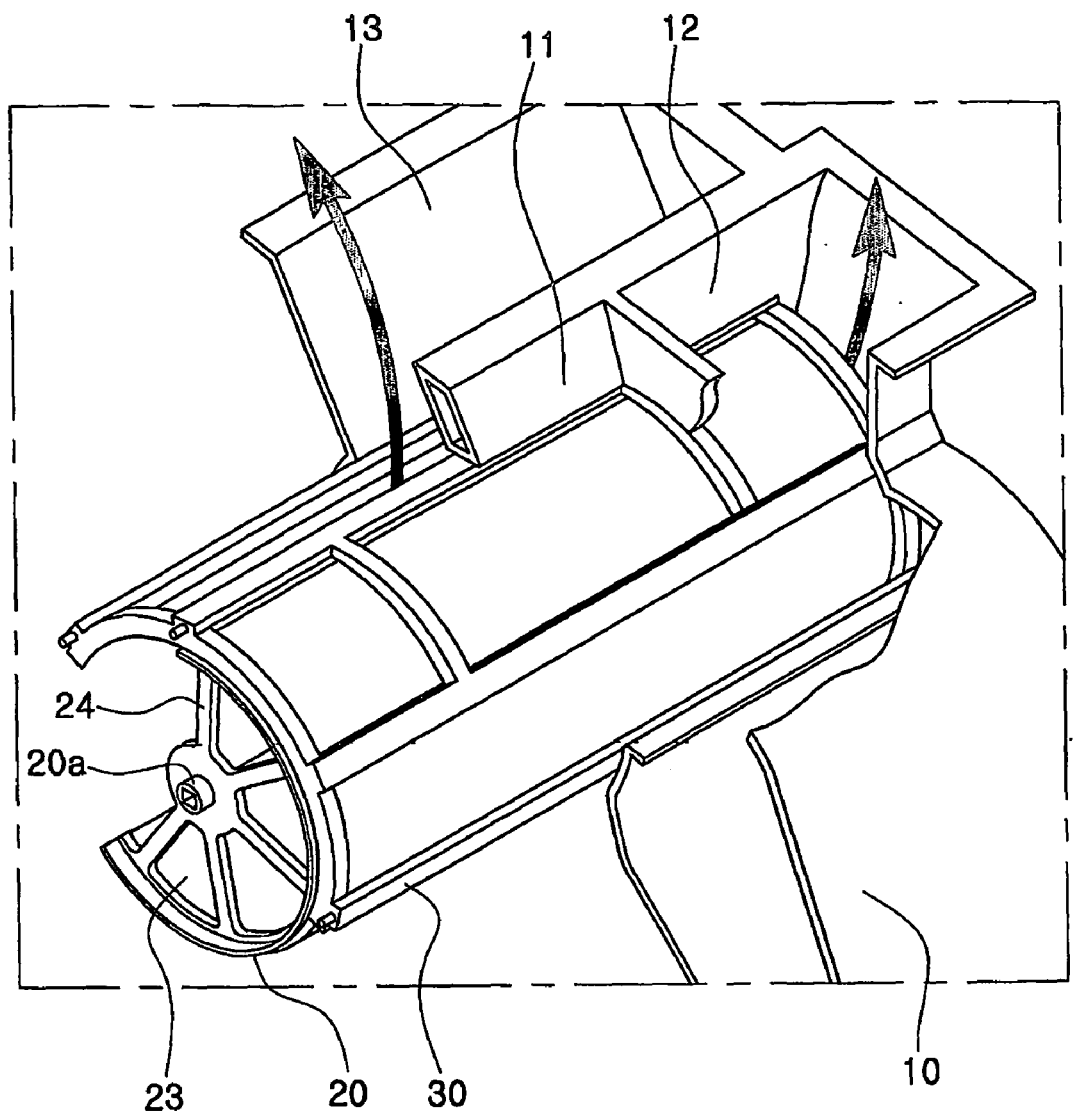
FIG. 9b is a view of the mode door in a defrost mode state.
Figure 10:
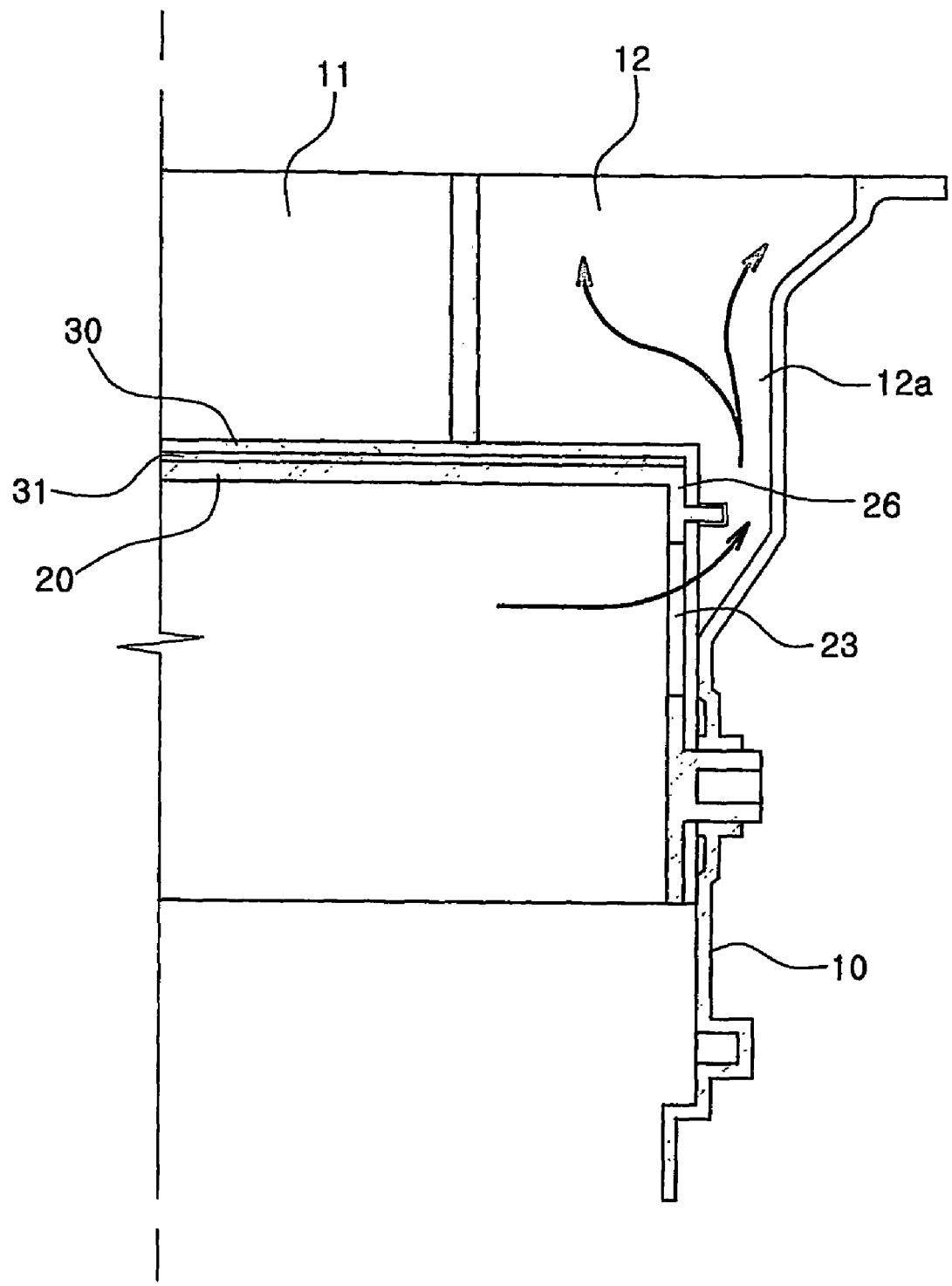
FIG. 10 is a sectional view taken along line X-X of FIG. 9.
Figure 11:
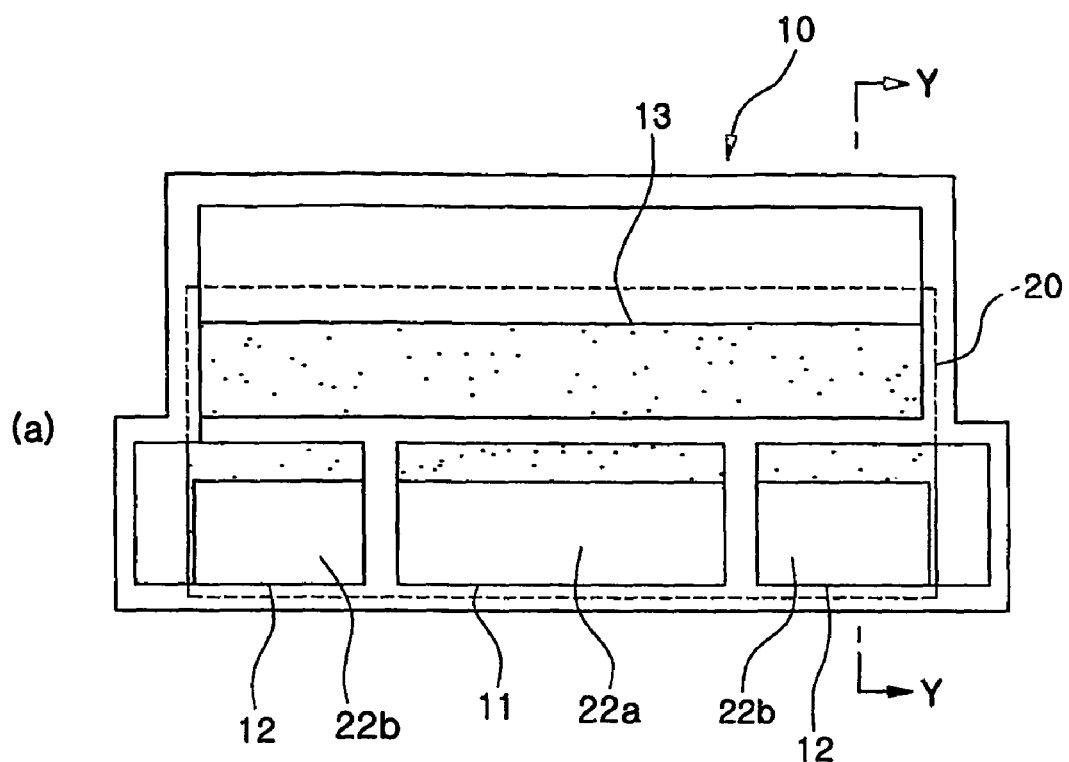
FIG. 11 are plan views of an air conditioning system of an embodiment of the present invention when viewed from above, where
Figure 11:
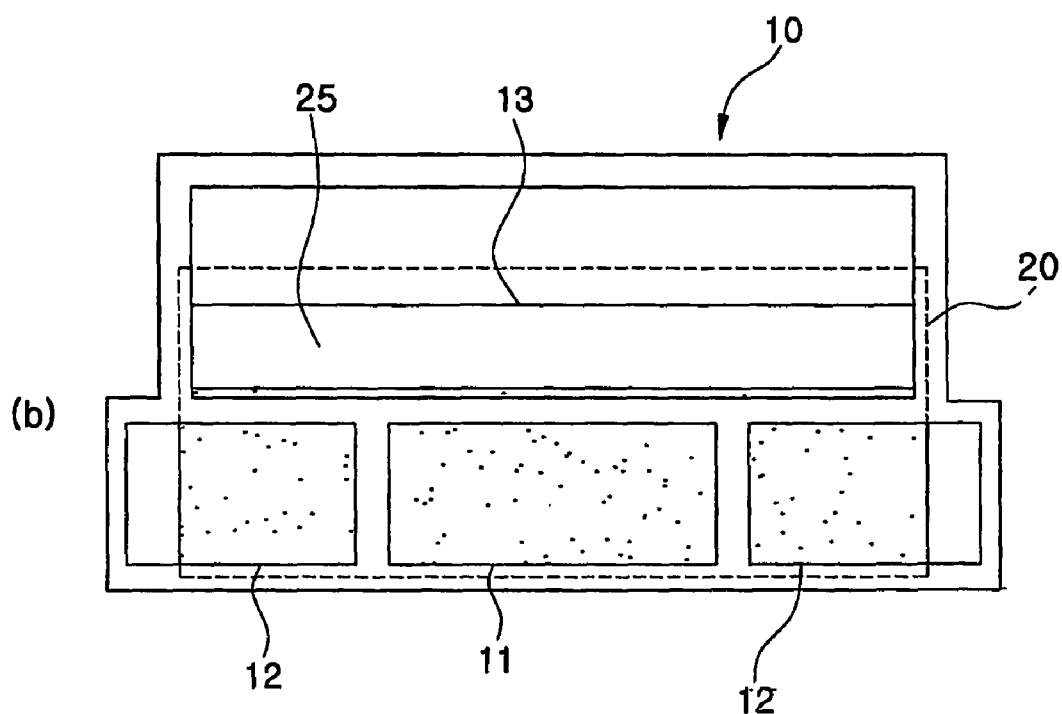

FIG. 9 are partially cutaway perspective views showing the mode door with the above structure mounted in the air conditioning case 10. FIG. 9a shows the mode door in a front mode state, and FIG. 9b shows the mode door in a defrost mode state. FIG. 10 is a sectional view taken along line X-X of FIG. 9. FIG. 11 are plan views of the air conditioning system of an embodiment of the present invention when viewed from above, where FIG. 11a shows the air conditioning system in a front mode, and FIG. 11b shows the air conditioning system in a defrost mode.

As shown in FIGS. 9, 10, and 11, the air conditioning system of an embodiment of the present invention includes the air conditioning case 10, inside of which the mode door described above is mounted.

As shown in FIG. 11, a plurality of air discharge openings are formed in the air conditioning case 10 as in the conventional system. In particular, there are formed in the air conditioning case 10 a center opening 11, side openings 12 to opposite sides of the center opening 11, a defrost opening 13, and a floor opening (not shown). However, the structure of the air conditioning case 10 of an embodiment of the present invention differs from that of the conventional structure in that the side openings 12 are formed extending to the outside along a lengthwise direction of the rotating door 20.

When in the front mode, with reference to FIGS. 9a and 11a, the center opening 11 and the side openings 12 of the air conditioning case 10 communicate respectively with the center aperture 22a and the side apertures 22b such that air supplied by operation of a fan (not shown) and introduced through the air inflow opening 25 of the rotating door 20 is discharged. Further, when in the defrost mode, with reference to FIGS. 9b and 11b, the defrost opening 13 of the air conditioning case 10 communicates with the air inflow opening 25 of the rotating door 20 such that air supplied by operation of the fan is introduced through the center aperture 22a and the side apertures 22b by rotation of the rotating door 20, and discharged. In addition, with reference to FIGS. 10 and 11, the left and right apertures 23 to both sides of the rotating door 20 continuously communicate with paths 12a formed by extending the side openings 12 as described above. As a result, air supplied into the air conditioning case 10 is always discharged through the left and right apertures 23 and the paths 12 regardless of the specific mode that the system is in.

Figure 1:
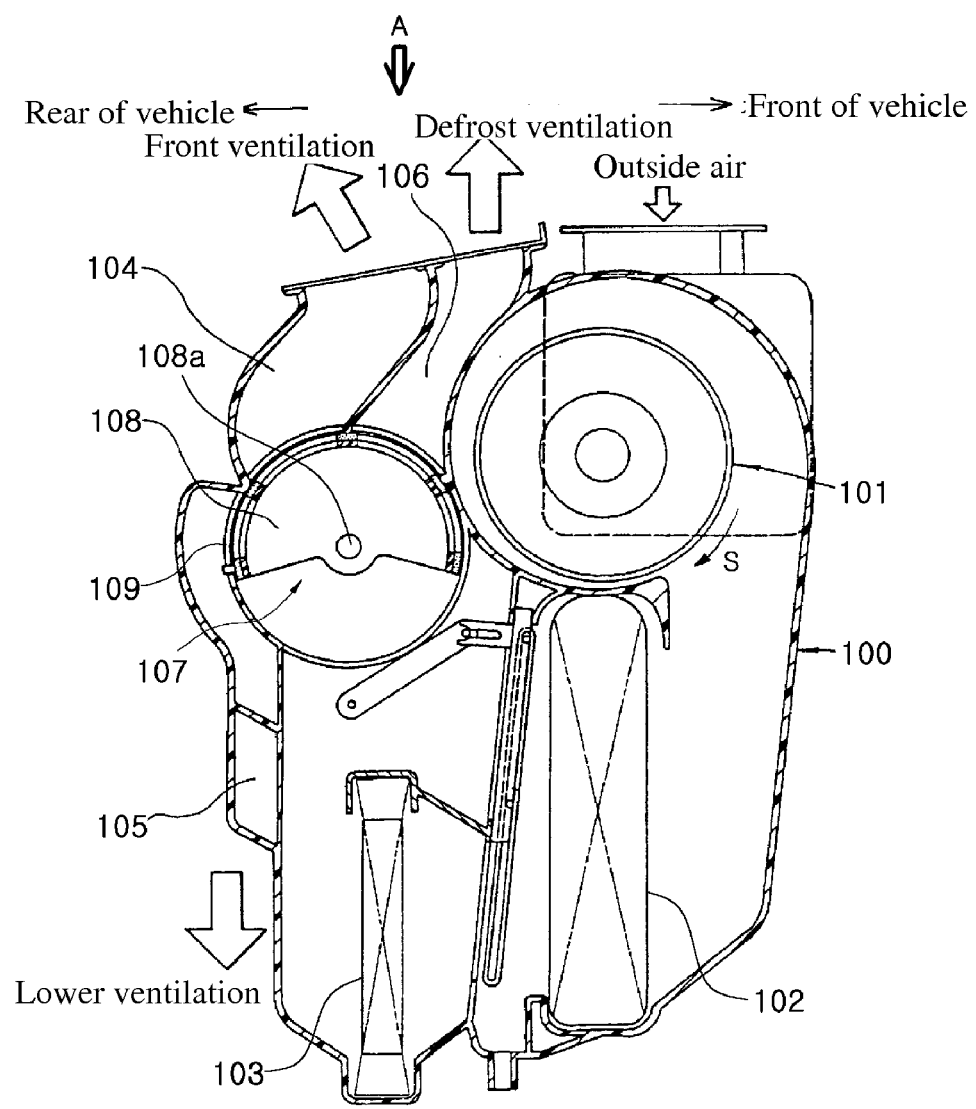
FIG. 1 is a schematic view showing main elements of a conventional air conditioning system for automobiles used to describe fan modes.
Figure 2:
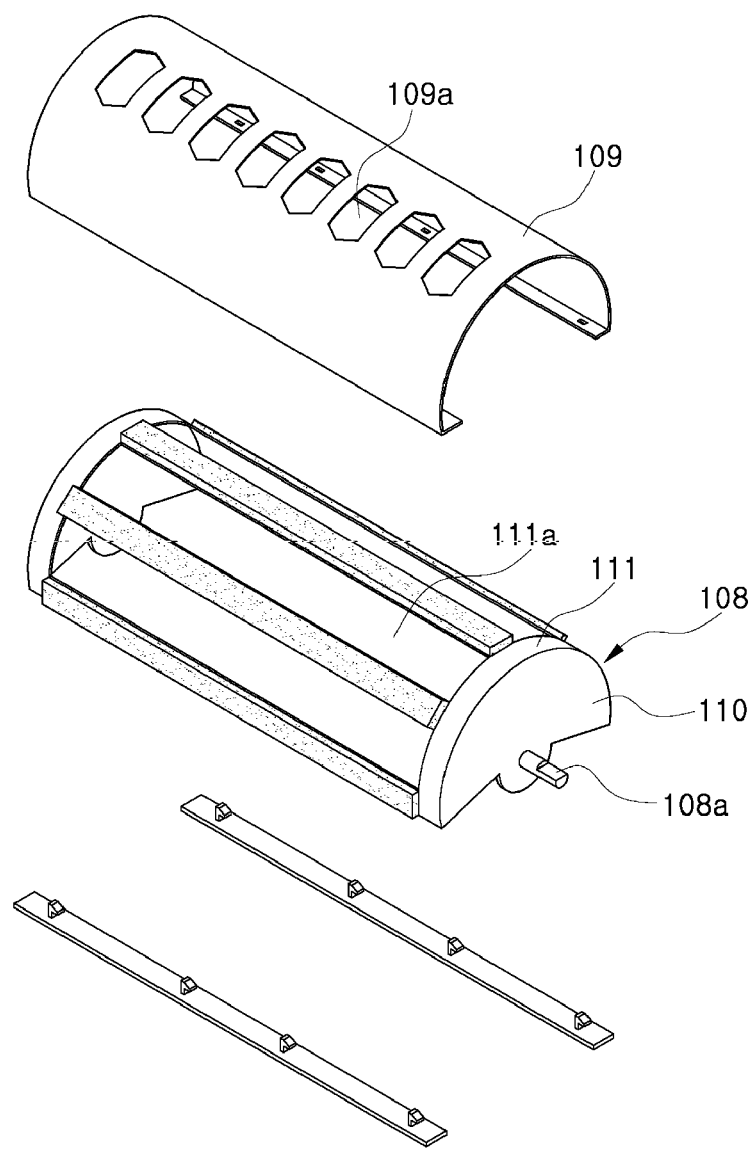
FIG. 2 is an exploded perspective view of a conventional cylindrical mode door.
Figure 3:
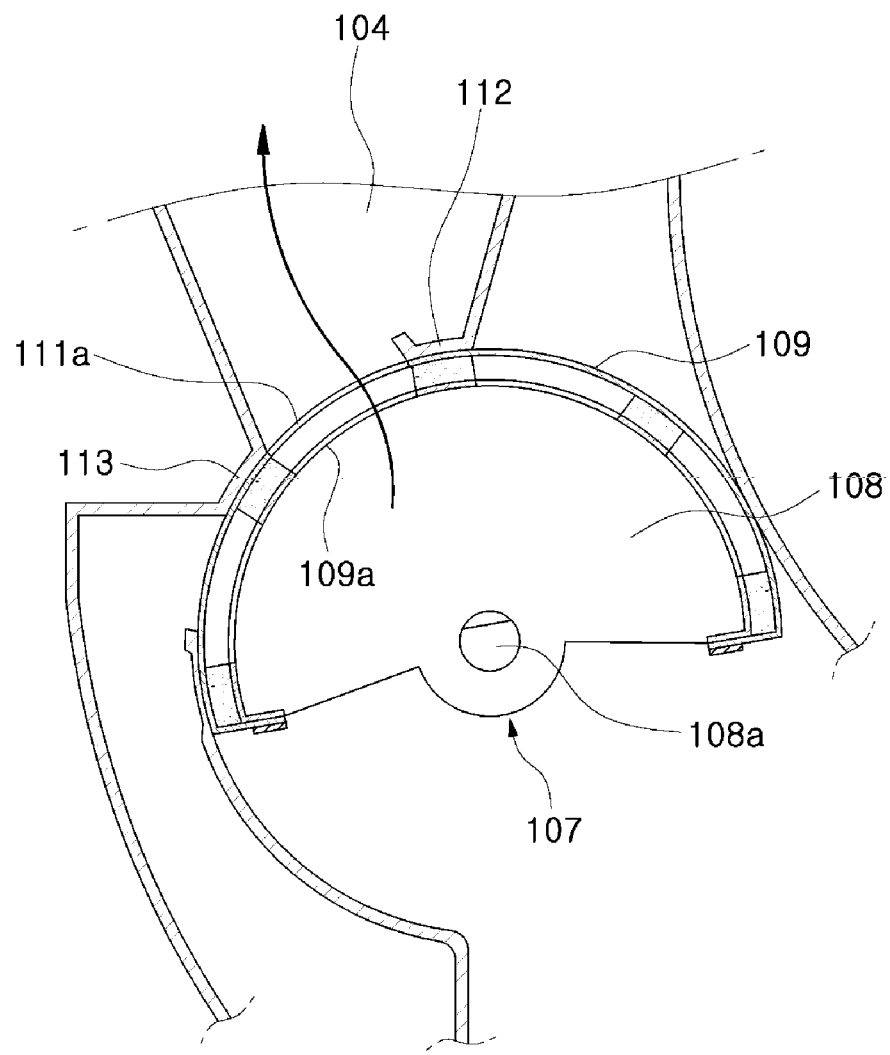
FIG. 3 is a sectional view used to describe fan mode conversion by operation of a conventional cylindrical mode door.
Figure 4:
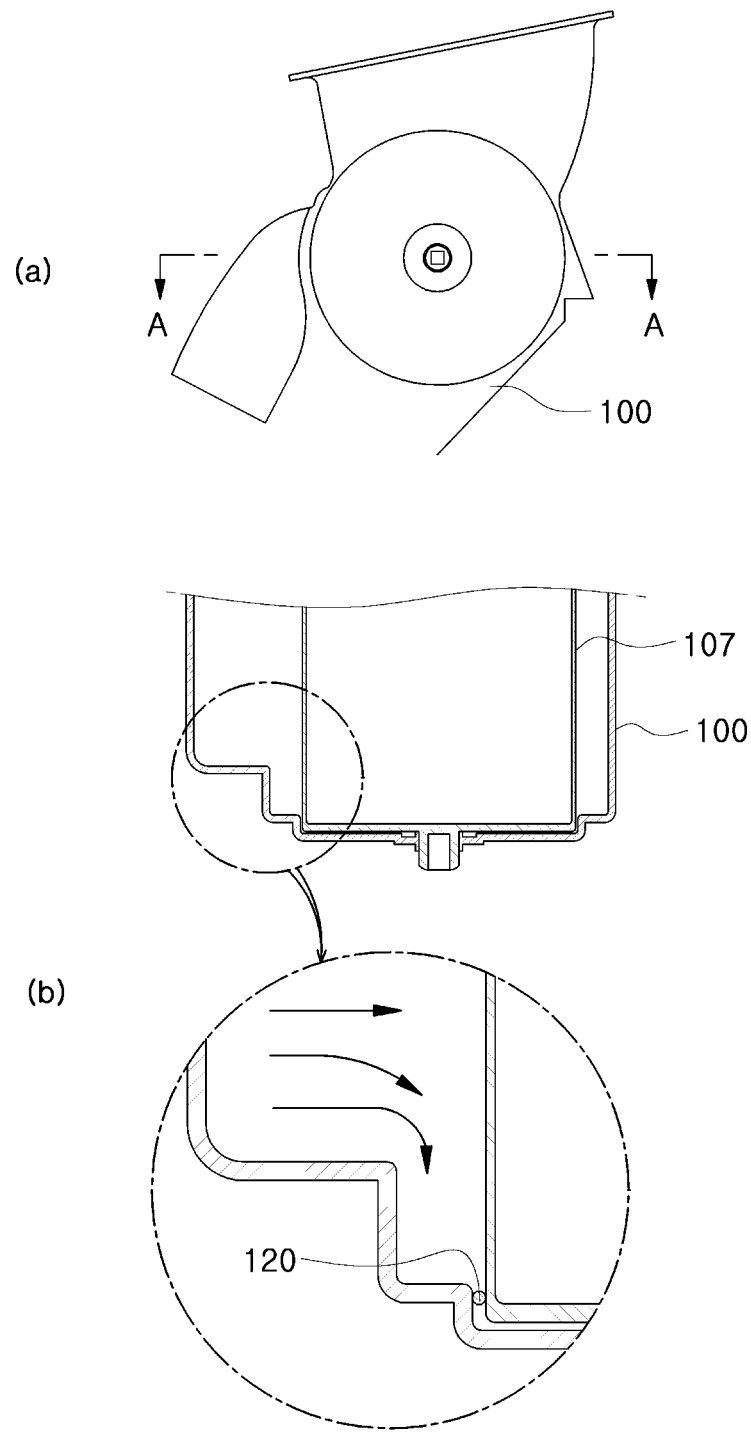
FIG. 4 is sectional views of a connecting structure between a side walls of a conventional cylindrical mode door and an air conditioning case, where
Figure 5:
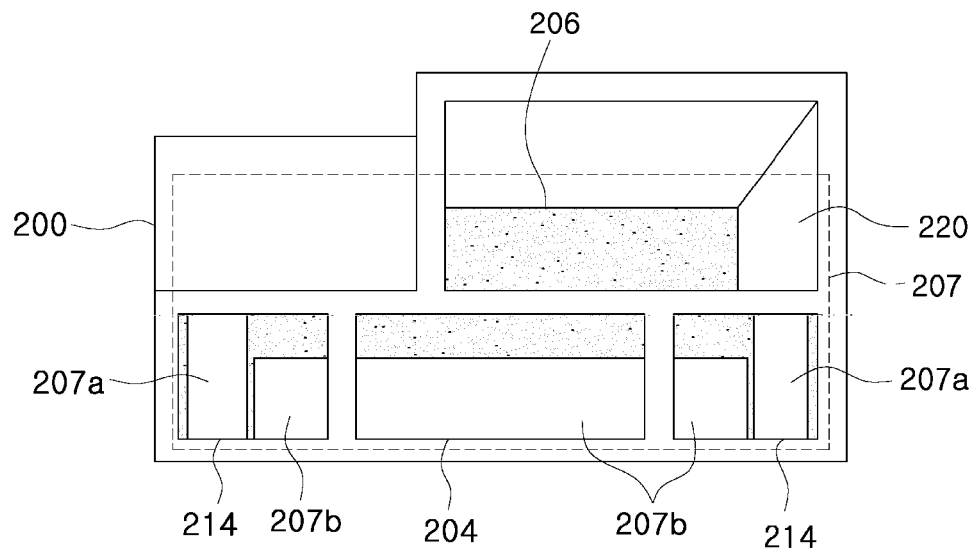
FIG. 5 are plan views of a conventional air conditioning system when viewed from above, where
Figure 5:
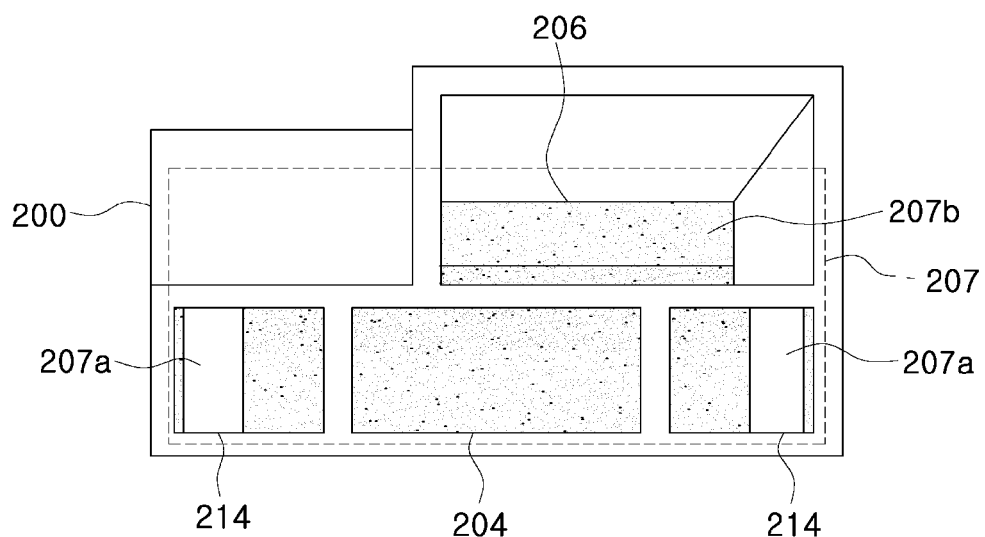

Therefore, in the air conditioning case 10 shown in FIGS. 9, 10, and 11, there is not provided a constant discharge opening cover 220 as in the conventional air conditioning case as shown in FIG. 5. A size of the defrost opening 13 formed in the air conditioning case 10 may be varied according to design requirements. Preferably, the defrost opening 13 is formed to a size such that it does not block the center aperture 22a and the side apertures 22b of the rotating door 20 such that the amount of air discharged to the inner surface of the front windshield through the defrost opening 13 is not reduced in the defrost mode.

Figure 12:
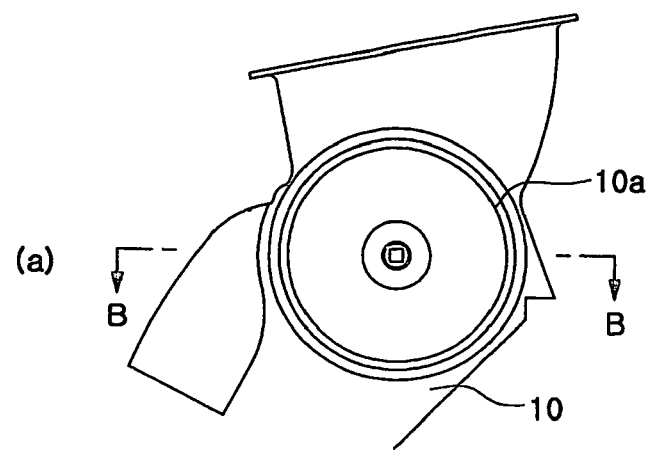
FIG. 12 are sectional views of a structure of air leakage preventing means according to a first embodiment of the present invention, where
Figure 12:
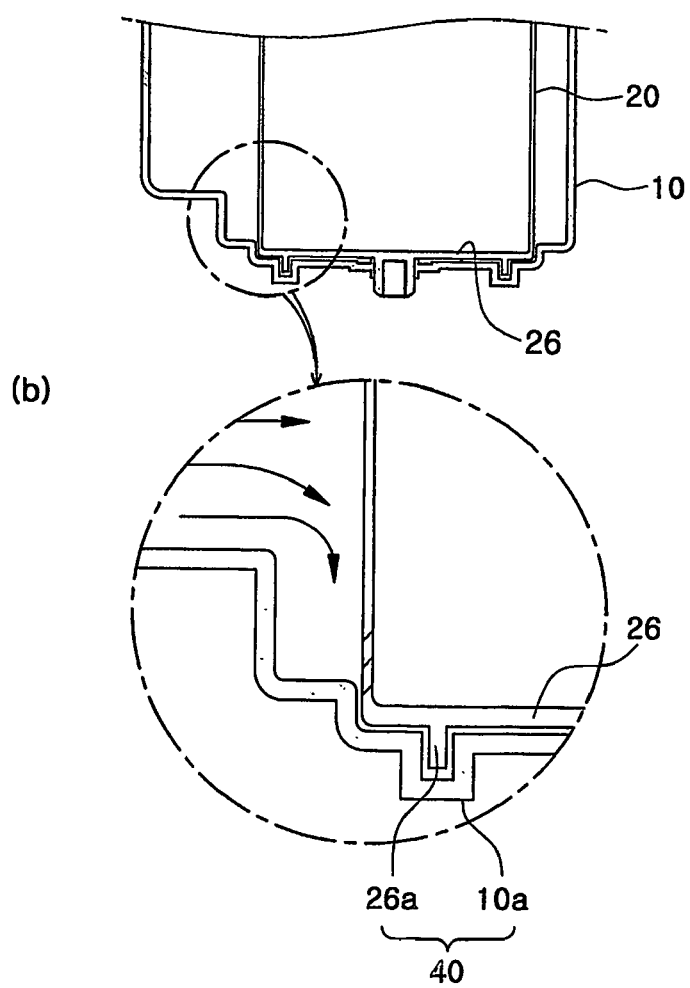

FIG. 12 shows sectional views of a structure of air leakage preventing means according to a first embodiment of the present invention, where FIG. 12a is a partial side sectional view of a state in which the rotating door 20 is mounted to the air conditioning case 10, and FIG. 12b is a sectional view taken along line B-B of FIG. 12a.

As shown in FIG. 12, the air leakage preventing means 40 according to the first embodiment of the present invention includes protrusions 26a formed on both side surfaces 26 of the rotating door 20, and grooves 10a formed in opposing surfaces of the air conditioning case 10 to receive the protrusions 26a. Spaces between the inner surface of the air conditioning case 10 and the side surfaces 26 of the rotating door 20 are preferably made as small as possible without interfering with the rotation of the rotating door 20 and so that the leakage of air through these spaces is reduced as much as possible.

With reference to FIG. 12, part of the air introduced by operation of the fan is directed toward the spaces between the side surfaces 26 of the rotating door 20 and the inner surface of the air conditioning case 10. When this occurs, the air is prevented from flowing along its path by the combination of the protrusions 26a of the rotating door 20 and the grooves 10a of the air conditioning case 10. Therefore, the leakage of air between the air conditioning case 10 and the side surfaces 26 of the rotating door 20 is reduced.

Figure 13:
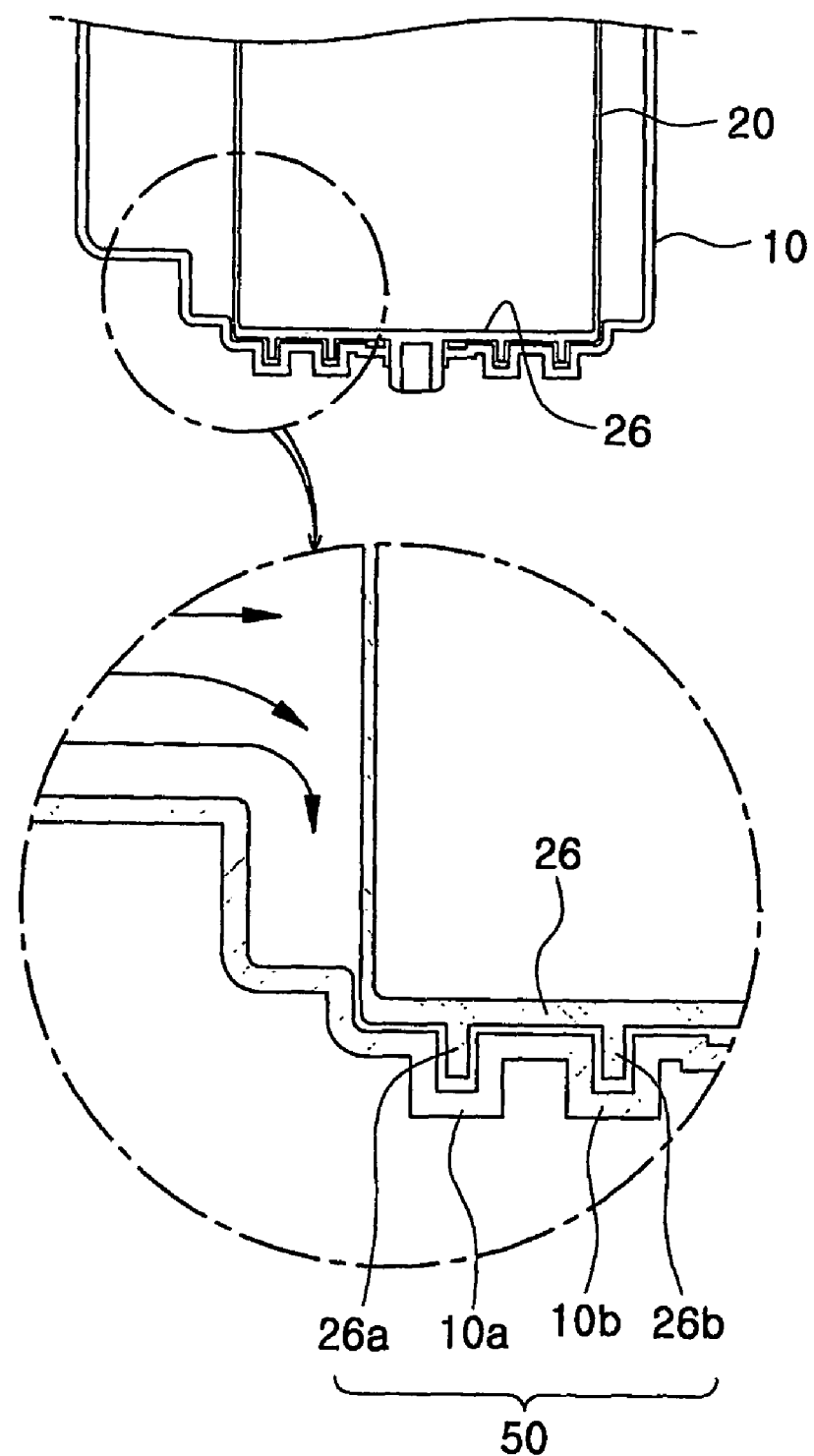
FIG. 13 is a sectional view of a structure of an air leakage preventing means according to a second embodiment of the present invention.

FIG. 13 is a sectional view showing a structure of air leakage preventing means 50 according to a second embodiment of the present invention. The air leakage preventing means 50 includes two protrusions 26a and 26b formed in each of the side surfaces 26 of the rotating door 20, and two grooves 10a and 10b formed in each of the opposing surfaces of the air conditioning case 10. According to this embodiment, the path in which air flows is further blocked compared to the first embodiment where there is formed only one of the protrusions 26a and one of the grooves 10a respectively to each side surface 26 of the rotating door 20 and the corresponding opposing surface of the air conditioning case 10. This acts to further minimize air leakage between the inner surface of the air conditioning case 10 and the side surfaces 26 of the rotating door 20. The number of protrusions and grooves may be further increased.

Figure 14:
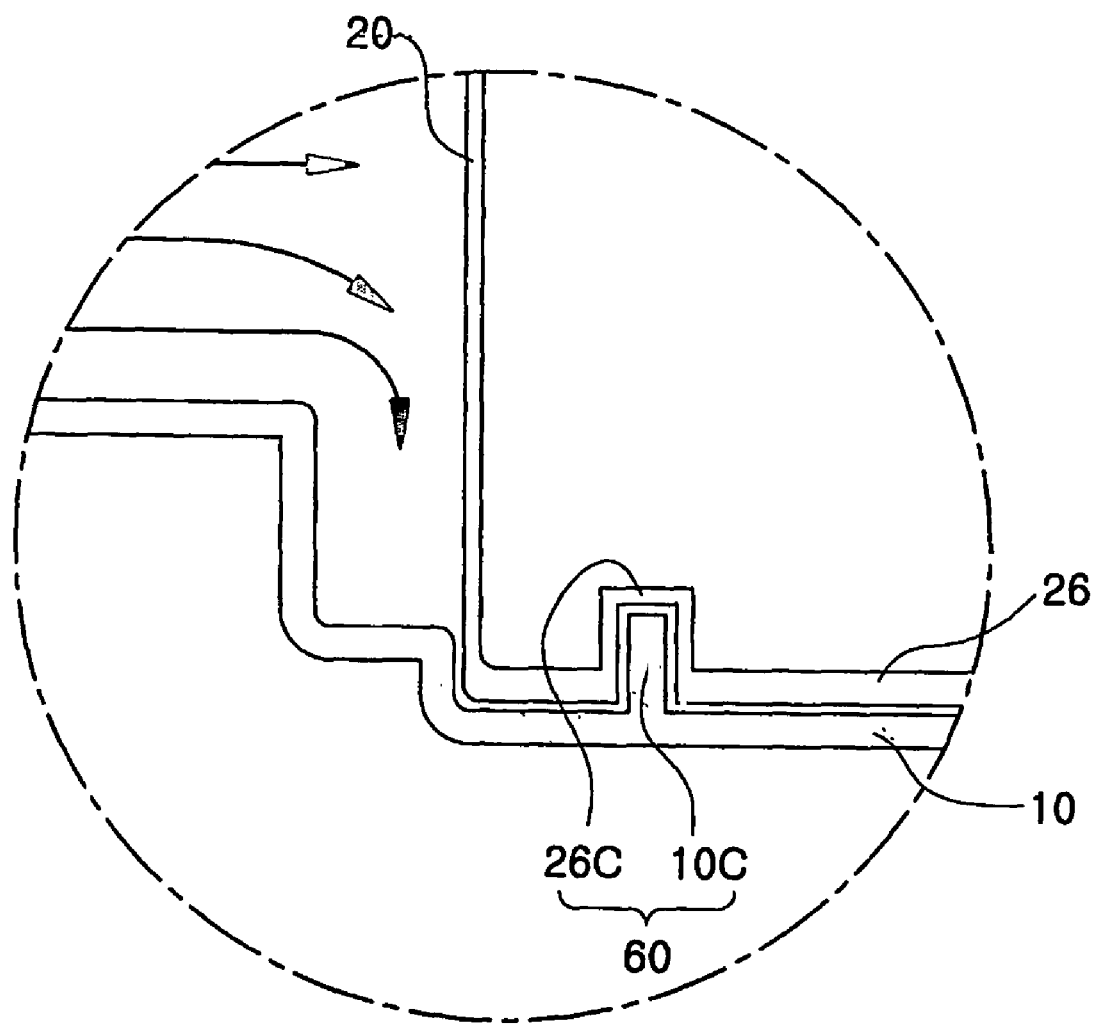
FIG. 14 is a sectional view of a structure of an air leakage preventing means according to a third embodiment of the present invention.

FIG. 14 is a sectional view showing a structure of air leakage preventing means 60 according to a third embodiment of the present invention.

A structure is used in this embodiment that is opposite the structure used in the first and second embodiments. In particular, grooves 26c are formed in the side surfaces 26 of the rotating door 20 and protrusions 10c that are received in the grooves 26c are formed in opposing surfaces of the air conditioning case 10. It is possible also to add additional grooves 26c and protrusions 10c respectively in the rotating door 20 and the air conditioning case 10.

Figure 15:
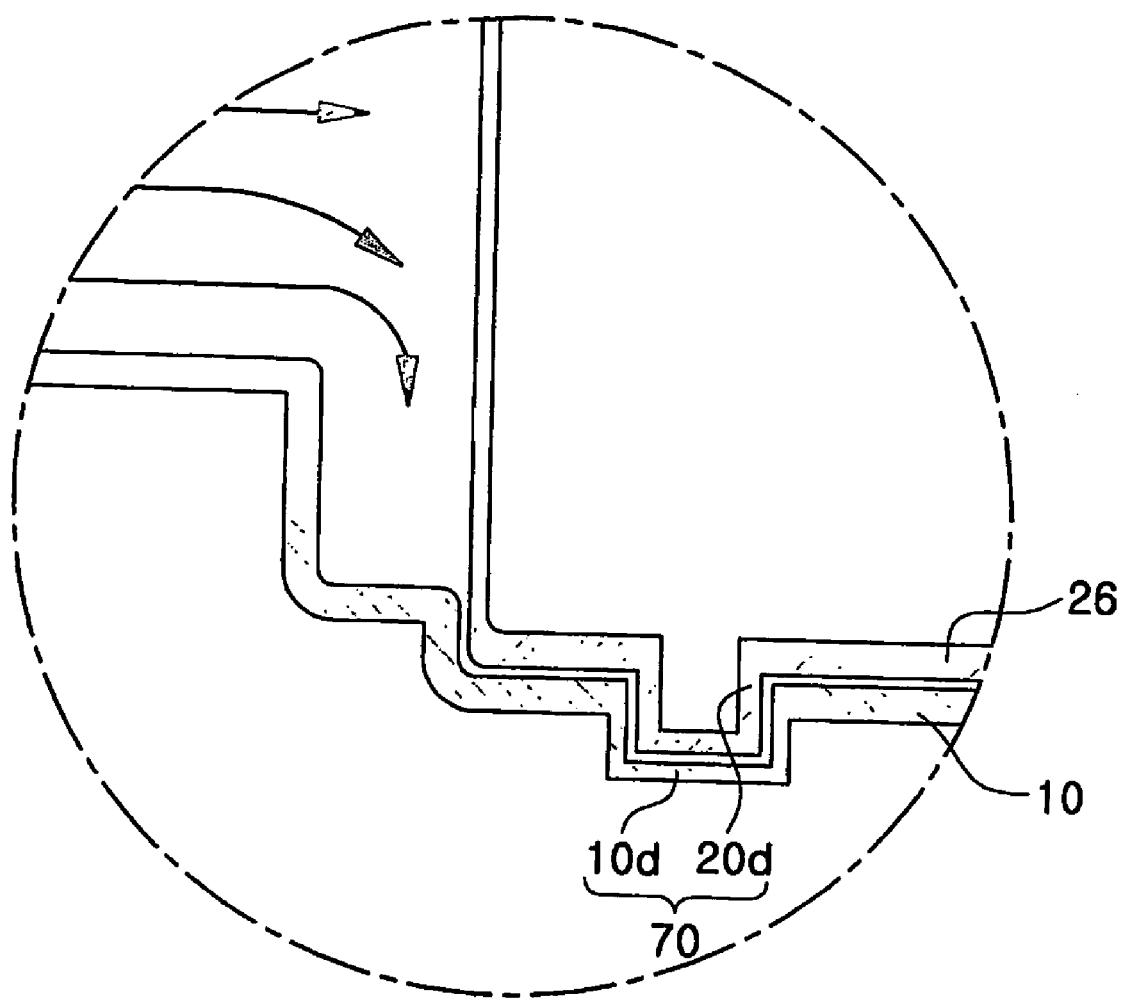
FIG. 15 is a sectional view of a structure of an air leakage preventing means according to a fourth embodiment of the present invention.

FIG. 15 is a sectional view showing a structure of air leakage preventing means 70 according to a fourth embodiment of the present invention.

In this embodiment, a stepped portion 26d is formed in each of the side surfaces 26 of the rotating door 20, and grooves 10d are formed in opposing surfaces of the air conditioning case to receive the stepped portions 26d. Additional stepped portions 26d and grooves 10d may be formed respectively in the rotating door 20 and the air conditioning case 10.

Figure 16:
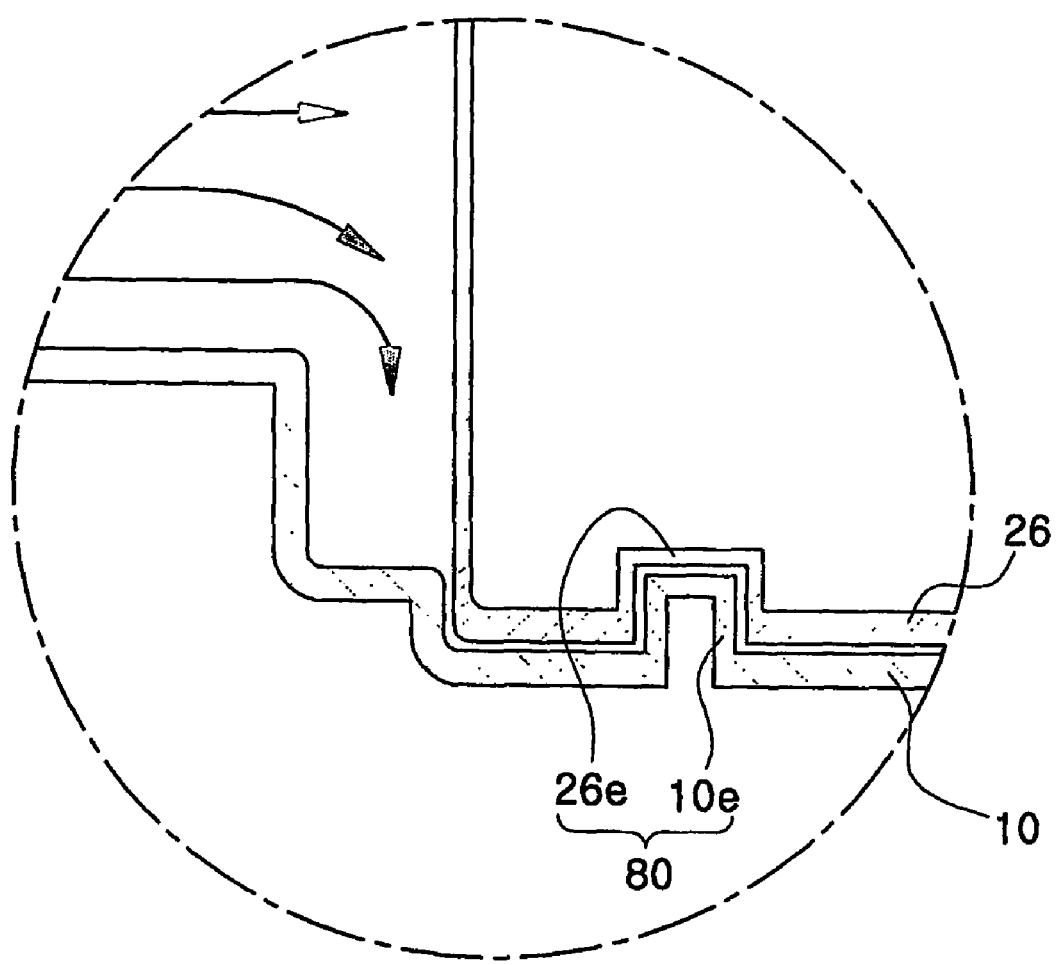
FIG. 16 is a sectional view of a structure of an air leakage preventing means according to a fifth embodiment of the present invention.

FIG. 16 is a sectional view showing a structure of air leakage preventing means 80 according to a fifth embodiment of the present invention.

A structure is used in this embodiment that is opposite the structure used in the fourth embodiment. In particular, grooves 26e are formed in the side surfaces 26 of the rotating door 20 and stepped portions 10e that are received in the grooves 26e are formed in opposing surfaces of the air conditioning case 10. It is possible also to add additional grooves 26e and stepped portions 10e respectively in the rotating door 20 and the air conditioning case 10.

The elements forming the above air leakage preventing means of the protrusions 10c, 26a, and 26b, the grooves 10a, 10b, 10d, 26c, and 26e, and the stepped portions 10d, 10e, and 26d are continuously formed along a rotational direction of the mode door.

Operation of the air conditioning system for automotive vehicles of the embodiments of the present invention that has the structure as described above will now be described according to each mode.

FIGS. 17 through 21 schematically show the flow of air in each mode when the system is viewed from direction Y-Y of FIG. 11a.

Front Mode

Figure 17:
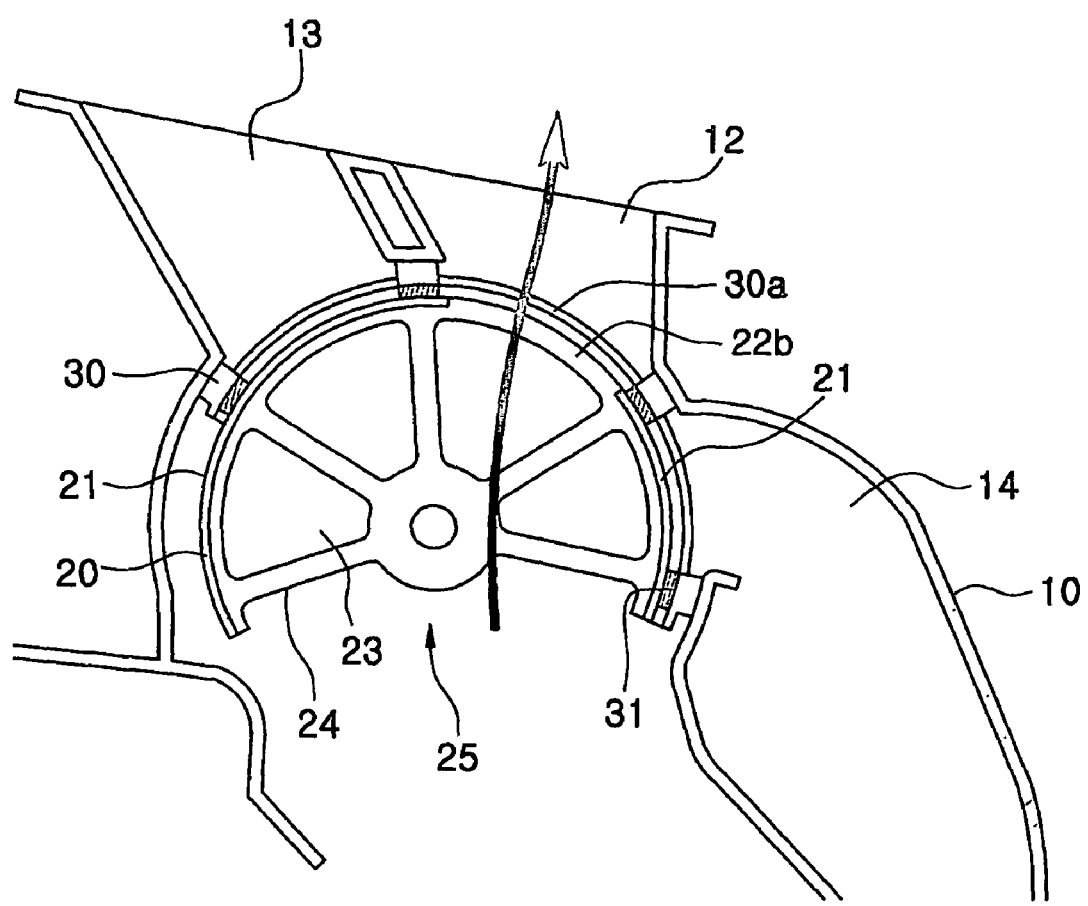
FIG. 17 is a sectional view of the flow of air in a front mode of an air conditioning system for automotive vehicles according to an embodiment of the present invention.

FIG. 17 schematically shows the flow of air in a front mode.

In the front mode, as shown in FIG. 17, the center aperture 22a and the side apertures 22b of the rotating door 20 are positioned communicating with the center opening 11 and the side openings 12 of the air conditioning case 10, while the defrost opening 13 and the floor opening 14 are blocked by the outer circumferential wall 21 of the rotating door 20. As a result, air introduced through the air inflow opening 25 of the rotating door 20 passes through the center aperture 22a and the side apertures 22b of the rotating door 20, and through the ventilation apertures 30a of the door cover 30 to be discharged through the center opening 11 and the side openings 12 into the front area of the passenger compartment. Part of the air introduced through the air inflow opening 25 of the rotating door 20 is constantly discharged to sides of the passenger compartment by passing through the left and right apertures 23 of the rotating door 20 and through the paths 12a formed in the side openings 12 of the air conditioning case 10.

Defrost Mode

Figure 18:
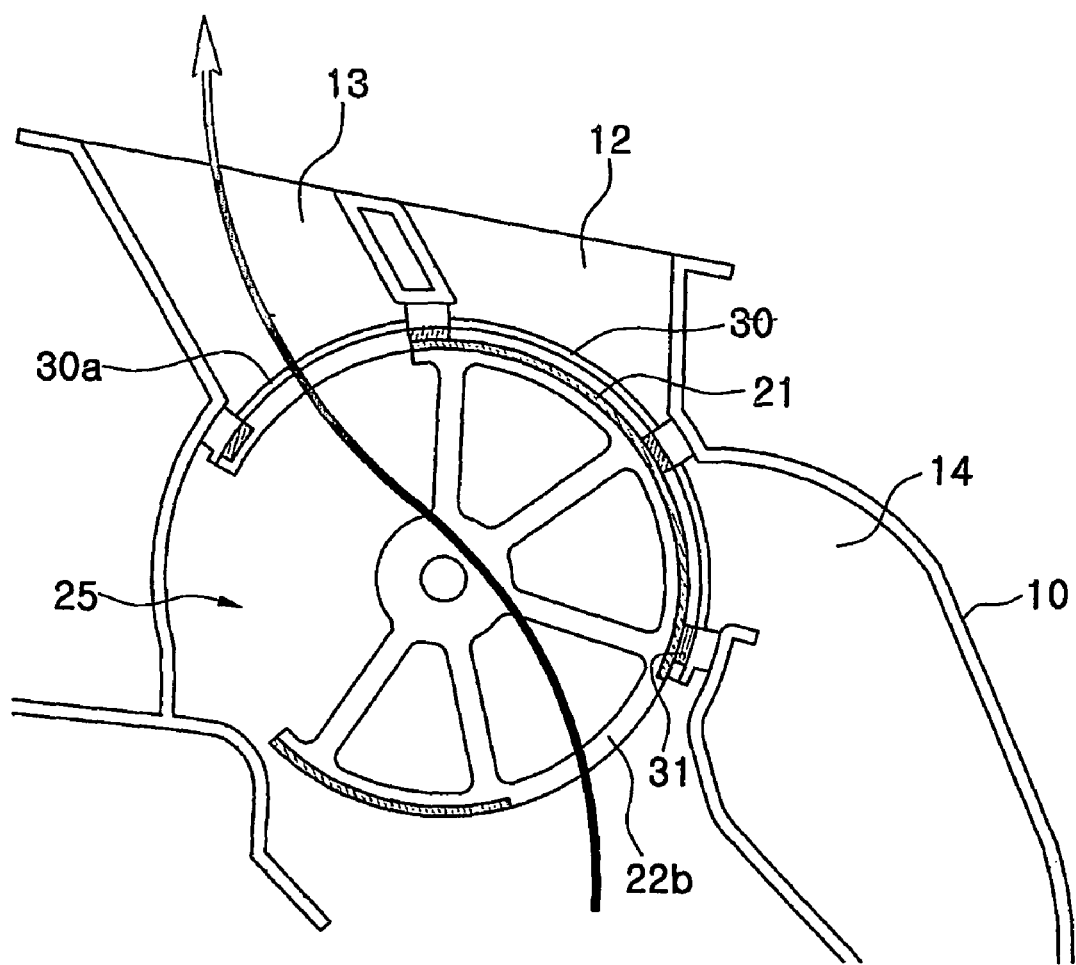
FIG. 18 is a sectional view of the flow of air in a defrost mode of an air conditioning system for automotive vehicles according to an embodiment of the present invention.

FIG. 18 schematically shows the flow of air in a defrost mode.

In the defrost mode, as shown in FIG. 18, the air inflow opening 25 of the rotating door 20 is positioned communicating with the defrost opening 13 of the air conditioning case 10, and the center opening 11, the side openings 12, and the floor opening 14 are blocked by the outer circumferential wall 21 of the rotating door 20. As a result, air introduced through the center aperture 22a and the side apertures 22b of the rotating door 20 passes through the air inflow opening 25 of the rotating door 20 and the ventilation apertures 30a of the door cover 30 to be discharged toward the inside surface of the front windshield via the defrost opening 13. As when in the front mode, part of the air introduced through the center aperture 22a and the side apertures 22b of the rotating door 20 is continuously discharged to sides of the passenger compartment by passing through the left and right apertures 23 of the rotating door 20 and through the paths 12a formed in the side openings 12 of the air conditioning case 10.

Floor Mode

Figure 19:
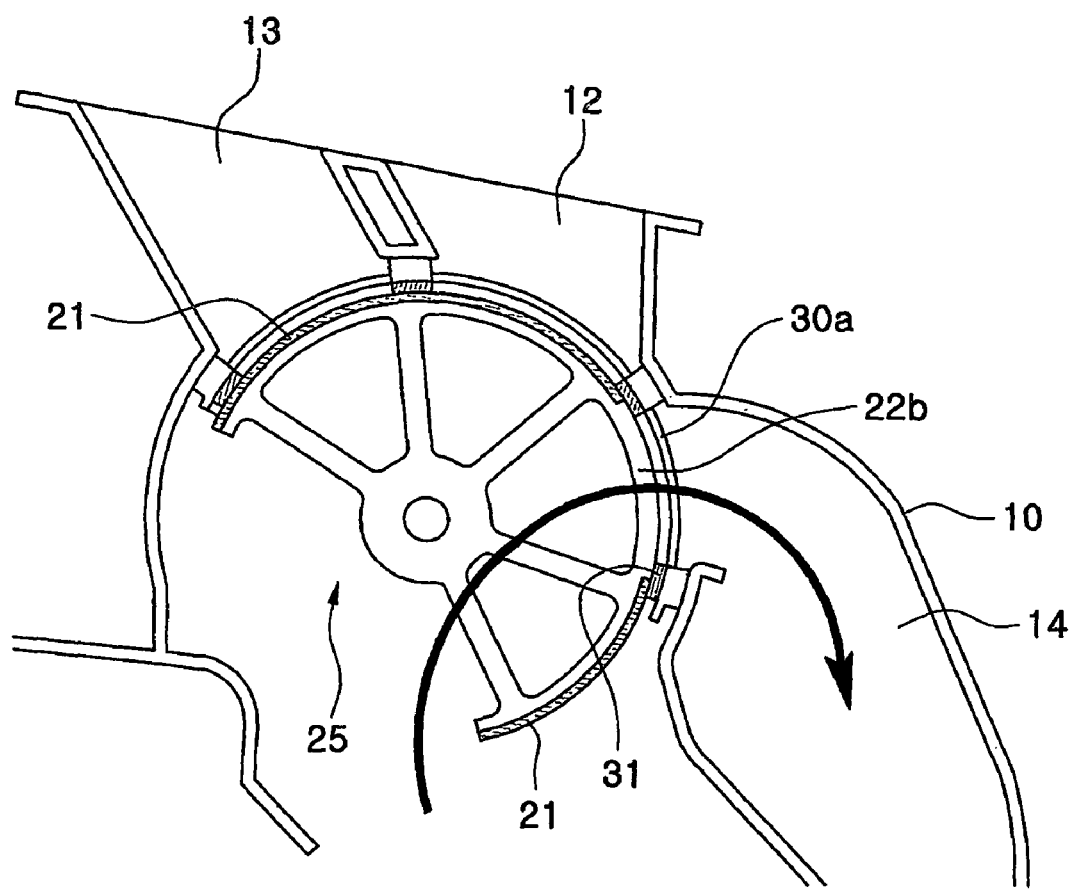
FIG. 19 is a sectional view of the flow of air in a floor mode of an air conditioning system for automotive vehicles according to an embodiment of the present invention.

FIG. 19 schematically shows the flow of air in a floor mode.

In the floor mode, as shown in FIG. 19, the center aperture 22a and the side apertures 22b of the rotating door 20 are positioned communicating with the floor opening 14 of the air conditioning case 10, while the center opening 11, the side openings 12, and the defrost opening 13 are blocked by the outer circumferential wall 21 of the rotating door 20. As a result, air introduced through the air inflow opening 25 of the rotating door 20 passes through the center aperture 22a and the side apertures 22b of the rotating door 20, and through the ventilation apertures 30a of the door cover 30 to be discharged through the floor opening 14 into the floor area of the passenger compartment. As when in the front mode, part of the air introduced through the air inflow opening 25 of the rotating door 20 is constantly discharged to sides of the passenger compartment by passing through the left and right apertures 23 of the rotating door 20 and through the paths 12a formed in the side openings 12 of the air conditioning case 10.

Bi-Level Mode

Figure 20:
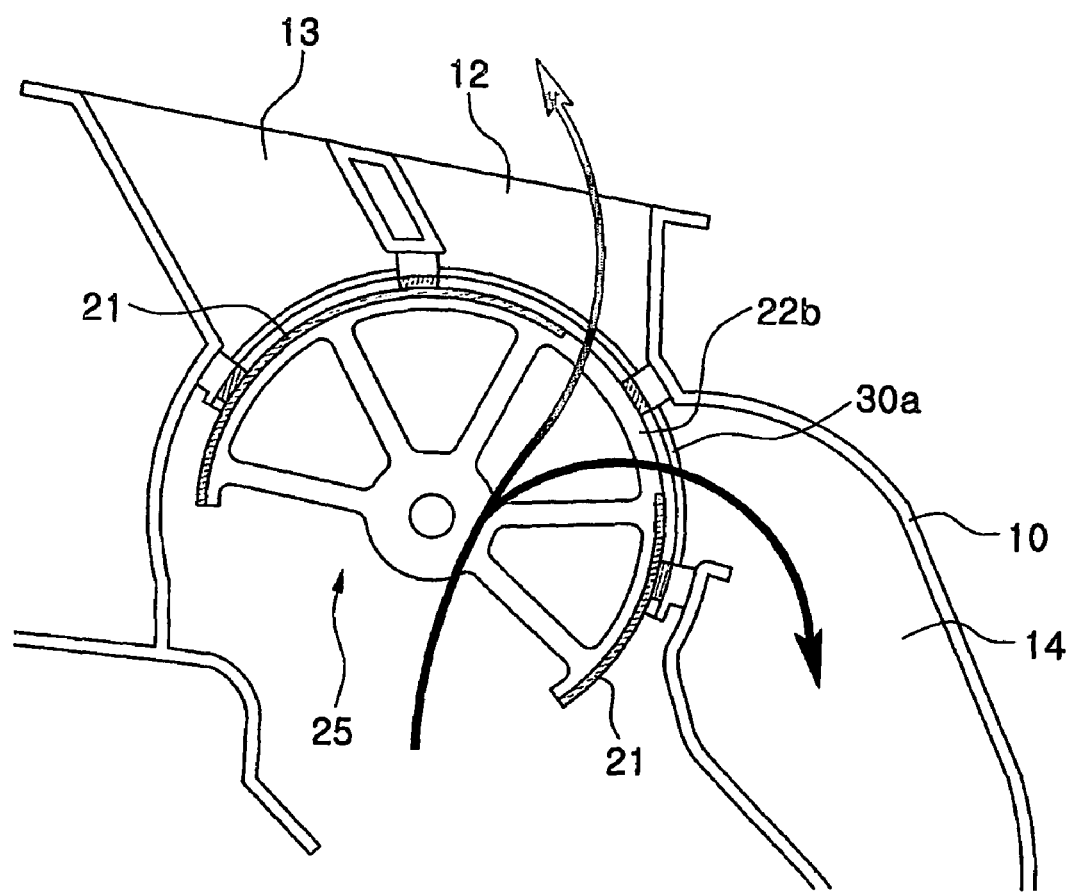
FIG. 20 is a sectional view of the flow of air in a bi-level mode of an air conditioning system for automotive vehicles according to an embodiment of the present invention.

FIG. 20 schematically shows the flow of air in a bi-level mode.

In the bi-level mode, as shown in FIG. 20, the center aperture 22a and the side apertures 22b of the rotating door 20 are positioned at centers of openings of the center opening 11, the side openings 12, and the floor opening 14 of the air conditioning case 10, while part of the side openings 12 and the all of the defrost opening 13 are blocked by the outer circumferential wall 21 of the rotating door 20. As a result, air introduced through the air inflow opening 25 of the rotating door 20 passes through the center aperture 22a and the side apertures 22b of the rotating door 20, and through the ventilation apertures 30a of the door cover 30 to be discharged through the center opening 11, the side openings 12, and the floor opening 14 into the passenger compartment in two directions. As when in the front mode, defrost mode, and floor mode, part of the air introduced through the air inflow opening 25 of the rotating door 20 is constantly discharged to sides of the passenger compartment by passing through the left and right apertures 23 of the rotating door 20 and through the paths 12a formed in the side openings 12 of the air conditioning case 10.

Mix Mode

Figure 21:
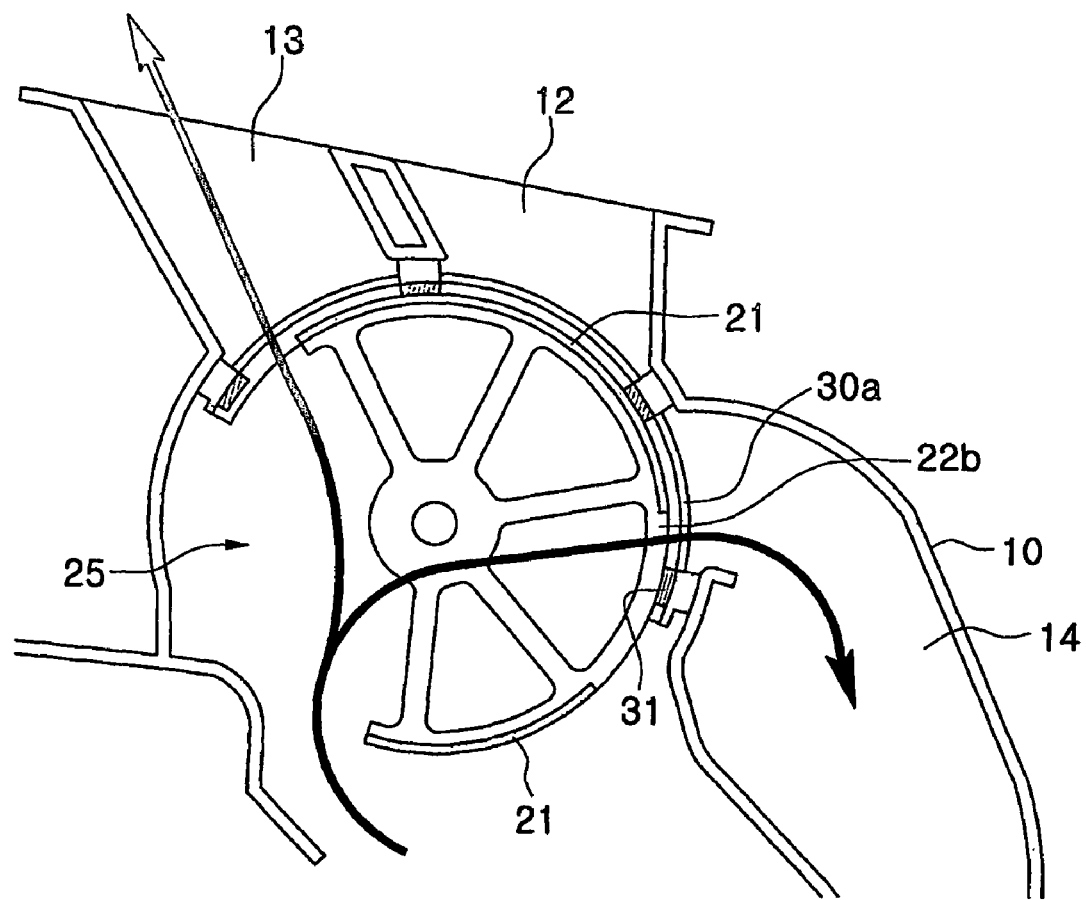
FIG. 21 is a sectional view of the flow of air in a mix mode of an air conditioning system for automotive vehicles according to an embodiment of the present invention.

FIG. 21 schematically shows the flow of air in a mix mode.

In the mixed mode, as shown in FIG. 21, part of the center aperture 22a and part of the side apertures 22b of the rotating door 20 are positioned at the floor opening of the air conditioning case 10, and part of the air inflow opening 25 of the rotating door 20 is positioned at the defrost opening 13 of the air conditioning case 10. The remaining openings 11, 12, and 14 are blocked by the outer circumferential wall 21 of the rotating door 20. As a result, air introduced through the air inflow opening 25 of the rotating door 20 passes through the center aperture 22a, the side apertures 22b, and the air inflow opening 25 of the rotating door 20, and through the ventilation apertures 30a of the door cover 30 to be discharged through the defrost opening 13 and the floor opening 14 into the passenger compartment in two directions. As when in the above modes, part of the air introduced through the air inflow opening 25 of the rotating door 20 is constantly discharged to sides of the passenger compartment by passing through the left and right apertures 23 of the rotating door 20 and through the paths 12a formed in the side openings 12 of the air conditioning case 10.

In the air conditioning system for automotive vehicles of the embodiments of the present invention described above, air introduced into the air conditioning case 10 by the fan is constantly discharged to sides of the passenger compartment by passing through the left and right apertures 23 of the mode door and through the paths 12a formed in the side openings 12 of the air conditioning case 10. Further, there is not provided a constant discharge opening cover as in the conventional air conditioning system such that the amount of air discharged toward the inside surface of the front windshield through the defrost opening 13 is not reduced when in the defrost mode.

INDUSTRIAL APPLICABILITY

As described above, an air inflow opening is formed to both side surfaces of the mode door, and by extending the side openings outwardly in the lengthwise direction of the mode door 20, air introduced into the air conditioning case is always discharged to both sides of the passenger compartment regardless of the specific mode the system is in. Also, a reduction in the amount of air discharged through the defrost opening when in the defrost mode is prevented. In addition, by forming the air leakage preventing means in the side surfaces of the mode door and opposing surfaces of the air conditioning case, the leakage of air between the side surfaces of the mode door and the inner surface of the air conditioning case is effectively prevented to there improve air conditioning performance.

While embodiments of the present invention have been described with reference to the particular illustrative embodiments, it is not to be restricted by the embodiments but only by the appended claims. It is to be appreciated that those skilled in the art can change or modify the embodiments without departing from the scope and spirit of the present claims.

What is claimed is:

1. An air conditioning system for an automotive vehicle, the system including an air conditioning case that has (i) formed therein (a) a center opening, (b) side openings, (c) a defrost opening, and (d) a floor opening, and (ii) mounted therein a mode door for opening and closing the openings depending on an operating mode of the air conditioning system, wherein the mode door is a turnable door comprising:
   a turnable shaft arrangement turnably supported on two side walls of the air conditioning case and having a longitudinal axis extending between the two side walls;
   an outer circumferential wall extending in the same direction as the longitudinal axis of the turnable shafts;
   a center aperture and side apertures individually formed on an upper surface of the outer circumferential wall;
   connectors for connecting the outer circumferential wall and the rotating shafts to thereby define left and right apertures; and
   an air inflow opening for enabling the introduction of air between the outer circumferential wall and the connectors,
   the air conditioning case including paths in fluid flow relation with the left and right apertures for causing air introduced into the mode door to be constantly discharged through the side openings via the left and right apertures,
   the outer circumferential wall of the turnable door carrying a door cover mounted inside the air conditioning case to closely contact a sealing member, the cover being located between the turnable door and the air conditioning case, the cover having ventilation apertures in fluid flow relation with (a) each of the center opening and side openings, and (b) the defrost opening and the floor opening; the sealing member being continuously mounted to a surface of the door cover contacting the outer circumferential wall of the turnable door alongside a longitudinal direction of the turnable door, and fixing means secured to an inner area of the air conditioning case.

2. The air conditioning system of claim 1, wherein the paths include outward extensions of the side openings, the extensions being in the direction of the longitudinal axis of the mode door.

3. The air conditioning system of claim 1, wherein the outer circumferential wall of the mode door is substantially in the shape of a circular arc.

4. The air conditioning system of claim 1, wherein the side apertures are formed adjacent to both sides of the center aperture.

5. The air conditioning system of claim 1, further including air leakage preventing means in the mode door and the air conditioning case.

6. The air conditioning system of claim 5, wherein the air leakage preventing means comprises at least one coupling part and at least one receiving part for receiving the at least one coupling part, the at least one coupling part and the at least one receiving part being side surfaces of the mode door and opposing surfaces of the air conditioning case.

7. The air conditioning system of claim 6, wherein the at least one coupling part is a protrusion in the side surfaces of the mode door, and the at least one receiving part is a groove in the air conditioning case to receive the protrusion of the mode door.

8. The air conditioning system of claim 6, wherein the at least one coupling part includes a stepped portion in the side surfaces of the mode door, and the at least one receiving part is a groove for receiving the stepped portion of the mode door.

9. The air conditioning system of claim 1, wherein the fixing means is arranged for securing the door cover to the air conditioning case and includes protruding fixing pins formed from side walls of the door cover.

\* \* \* \* \*